United States Patent
Takagi

(10) Patent No.: US 9,258,437 B2
(45) Date of Patent: Feb. 9, 2016

(54) PRINTING SYSTEM, CONTROL METHOD, AND COMPUTER-READABLE MEDIUM FOR CONTROLLING PRINTING OF DATA STORED IN A PRINT SERVER

(71) Applicant: CANON KABUSHIKI KAISHA, Tokyo (JP)

(72) Inventor: Yoshihiro Takagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 13/658,919

(22) Filed: Oct. 24, 2012

(65) Prior Publication Data
US 2013/0120784 A1 May 16, 2013

(30) Foreign Application Priority Data

Nov. 16, 2011 (JP) ................................ 2011-251023
Sep. 3, 2012 (JP) ................................ 2012-193572

(51) Int. Cl.
G06F 3/12 (2006.01)
G06K 15/00 (2006.01)
(Continued)

(52) U.S. Cl.
CPC ............ *H04N 1/0023* (2013.01); *G06F 3/1203* (2013.01); *G06F 3/1241* (2013.01); *G06F 3/1267* (2013.01); *G06F 3/1274* (2013.01); *G06F 3/1288* (2013.01); *H04N 1/00233* (2013.01); *H04N 1/00912* (2013.01); *G06F 3/1238* (2013.01); *G06F 3/1258* (2013.01); *H04N 1/00411* (2013.01);
(Continued)

(58) Field of Classification Search
CPC ... G06F 3/1204; G06F 3/1237; G06F 3/1288; G06F 3/1219; G06F 3/1296; G06F 3/1274; G06F 17/211

USPC ............. 358/1.6, 1.13, 1.14, 1.15, 1.16, 1.17, 358/403, 426.05, 437, 524, 1.18
See application file for complete search history.

(56) References Cited

U.S. PATENT DOCUMENTS 6,498,657 B1 * 12/2002 Kuntz et al. ................... 358/1.15
7,233,993 B2 6/2007 Sakai
(Continued)

FOREIGN PATENT DOCUMENTS

JP 4033857 B 1/2008

OTHER PUBLICATIONS

Chinese Office Action issued in corresponding application No. 201210466876.6 on Apr. 1, 2015.

*Primary Examiner* — Mohammad Ghayour
*Assistant Examiner* — Jonathan R Beckley
(74) *Attorney, Agent, or Firm* — Carter, DeLuca, Farrell & Schmidt, LLP

(57) ABSTRACT

A system comprises an image forming apparatus and a server, the image forming apparatus including: a receiving unit which receives the series of data from the server; a transfer unit which transfers a plurality of print jobs included in the series of data to a printing unit; and an accepting unit which accepts a cancel instruction for the series of data from a user, wherein when the receiving unit accepts the cancel instruction while receiving the series of data, the receiving unit discards the plurality of print jobs until termination data is received, and when the transfer unit accepts the cancel instruction while transferring the series of data, the transfer unit cancels transfer of the plurality of print jobs to the printing unit, and instructs the printing unit to cancel printing of a transferred print job.

16 Claims, 23 Drawing Sheets

(51) Int. Cl.
*H04N 1/00* (2006.01)
*H04N 1/32* (2006.01)

(52) U.S. Cl.
CPC ....... *H04N 1/00477* (2013.01); *H04N 1/32635* (2013.01); *H04N 1/32657* (2013.01); *H04N 2201/0094* (2013.01); *H04N 2201/0098* (2013.01); *H04N 2201/3214* (2013.01); *H04N 2201/3216* (2013.01); *H04N 2201/3222* (2013.01); *H04N 2201/3226* (2013.01); *H04N 2201/3273* (2013.01)

(56) References Cited

U.S. PATENT DOCUMENTS

| | | | | |
|---|---|---|---|---|
| 7,307,749 | B2* | 12/2007 | Nishikawa | G06F 3/1205 358/1.15 |
| 7,324,224 | B2* | 1/2008 | Shima | G06K 15/00 358/1.15 |
| 8,319,986 | B2* | 11/2012 | Nakata et al. | 358/1.15 |
| 8,531,721 | B2* | 9/2013 | Minagawa | 358/1.9 |
| 8,537,408 | B2* | 9/2013 | Natori | G06F 17/211 358/1.12 |
| 8,610,911 | B2* | 12/2013 | Sasakura | G06K 15/1809 358/1.13 |
| 8,630,010 | B2* | 1/2014 | Iida | G06K 15/005 358/1.13 |
| 2005/0024673 | A1* | 2/2005 | Sakai | 358/1.14 |
| 2005/0179926 | A1* | 8/2005 | Nishikawa | G06F 3/1205 358/1.13 |
| 2005/0206913 | A1* | 9/2005 | Matsuda | G06F 3/1203 358/1.1 |
| 2006/0139690 | A1* | 6/2006 | Yagita | 358/1.15 |
| 2008/0123130 | A1* | 5/2008 | Matsumoto | G06F 3/1207 358/1.15 |
| 2012/0081741 | A1* | 4/2012 | Iida | G06K 15/005 358/1.15 |

* cited by examiner

F I G. 2
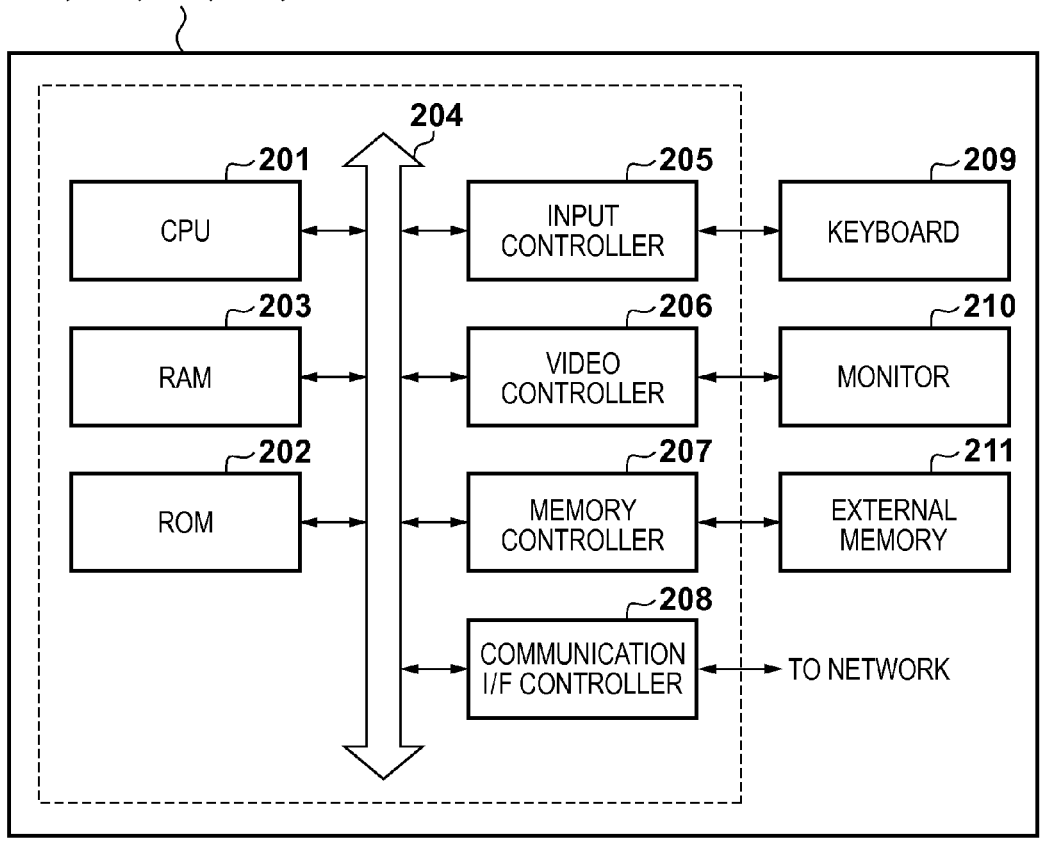

FIG. 6

```
<?xml version="1.0" encoding="utf-8"?>
<JobInfo
    Guid="{93DEBE22-682C-4806-AC24-CC8A4589A26F}"
    JobName="STATEMENT OF ACCOUNTS"
    UserName="Taro Yamada"
    PrintQueueName="PULL PRINT"
    >
      <DocumentSettings
         DevmodeSnapshot="QwBhAG4AbwBuACAAaQB..."
      />
</JobInfo>
```

FIG. 7A

```xml
<?xml version="1.0" encoding="utf-8"?>
<JobList>
   <JobInfo Guid="{93DEBE22-682C-4806-AC24-CC8A4589A26F}"JobName="STATEMENT OF ACCOUNTS">
      <DocumentSettings
         CopyCount="1"
         Duplexing="OneSided"
         OutputColor="Color"
         PagesPerSheet="1"
         DateTime="2010-1-14T10:19:00+09:00"
      />
   </JobInfo>
   <JobInfo Guid="{DO0AE377-4771-41c4-9A30-46BB3955367F}" JobName="ESTIMATE">
      <DocumentSettings
         CopyCount="5"
         Duplexing="OneSided"
         OutputColor="Monochrome"
         PagesPerSheet="1"
         DateTime="2010-1-14T10:19:00+09:00"
      />
   </JobInfo>
   <JobInfo Guid="{12258253-96CF-4896-8039-82627ADACB9A}" JobName="LEAVE OF ABSENCE APPLICATION">
      <DocumentSettings
         CopyCount="1"
         Duplexing="TwoSidedLongEdge"
         OutputColor="Monochrome"
         PagesPerSheet="1"
         DateTime="2010-1-14T10:19:00+09:00"
      />
   </JobInfo>
   <JobInfo Guid="{08DF859D-00F8-4619-A867-CD95330B6083}" JobName="PROJECT PROPOSAL">
      <DocumentSettings
         CopyCount="1"
         Duplexing="OneSided"
         OutputColor="Color"
         PagesPerSheet="1"
         DateTime="2010-1-14T10:20:00+09:00"
      />
```

FIG. 7B

```
    </JobInfo>
    <JobInfo Guid="{586B8D3F-9CDC-4f9c-A642-B5067FF357E6}" JobName="11111111112222222222233333333334444444444">
        <DocumentSettings
            CopyCount="1"
            Duplexing="OneSided"
            OutputColor="Monochrome"
            PagesPerSheet="1"
            DateTime="2010-1-14T10:20:00+09:00"
        />
    </JobInfo>
    <JobInfo Guid="{985908C2-D27E-479d-89F5-E02A41715817}" JobName="ABCDEFGHIJKLMN">
        <DocumentSettings
            CopyCount="1"
            Duplexing="OneSided"
            OutputColor="Monochrome"
            PagesPerSheet="1"
            DateTime="2010-1-14T10:21:00+09:00"
        />
    </JobInfo>
    <JobInfo Guid="{050AE3B0-5D19-4036-B3CE-FD5FACFBCC0C}" JobName="MEETING MATERIALS">
        <DocumentSettings
            CopyCount="1"
            Duplexing="OneSided"
            OutputColor="Color"
            PagesPerSheet="2"
            DateTime="2010-1-14T10:21:00+09:00"
        />
    </JobInfo>
</JobList>
```

FIG. 8

```xml
<?xml version="1.0" encoding="utf-8"?>
<JobInfo
    Guid="{93DEBE22-682C-4806-AC24-CC8A4589A26F}"
    DeviceModelName="Cxxx ix6000"
    >
      <DocumentSettings
         CopyCount="1"
         Duplexing="TwoSidedLongEdge"
         OutputColor="Color"
         PagesPerSheet="1"
      />
</JobInfo>
```

FIG. 10

PULL PRINT

👤 Taro Yamada

| | UPDATE | | DOCUMENT COUNT |
|---|---|---|---|
| | | | 7 |

| DOCUMENT NAME | COLOR MODE | DUPLEXING | PAGES PER SHEET | COPY COUNT | DATE & TIME |
|---|---|---|---|---|---|
| ■ STATEMENT OF ACCOUNTS | COLOR | ONE-SIDED | 1 in 1 | 1 COPY | 01/14 10:19 |
| ☐ ESTIMATE | MONOCHROME | ONE-SIDED | 1 in 1 | 5 COPIES | 01/14 10:19 |
| ☐ LEAVE OF ABSENCE APPLICATION | MONOCHROME | TWO-SIDED | 1 in 1 | 1 COPY | 01/14 10:19 |
| ☐ PROJECT PROPOSAL | COLOR | ONE-SIDED | 1 in 1 | 1 COPY | 01/14 10:20 |
| ☐ 1111111111222222222233333333334444444444 | MONOCHROME | ONE-SIDED | 1 in 1 | 1 COPY | 01/14 10:20 |
| ☐ ABCDEFGHIJKLMN | MONOCHROME | ONE-SIDED | 1 in 1 | 1 COPY | 01/14 10:21 |
| ☐ MEETING MATERIALS | COLOR | ONE-SIDED | 2 in 1 | 1 COPY | 01/14 10:21 |

[ERASE] ~921

[SELECT ALL] [RELEASE SELECTION]     922~ [PRINT]

[LOG OUT]

931 — COLOR MODE : ☐ MONOCHROME ☑ COLOR
932 — DUPLEXING : [ONE-SIDED ▼]
933 — PAGES PER SHEET : [1 in 1 ▼]
934 — COPY COUNT : [1]

PULL PRINT

☑ ERASE DOCUMENT AFTER PRINTING — 935
[CANCEL] — 936
[START PRINTING] — 937
[▶ LOG OUT]

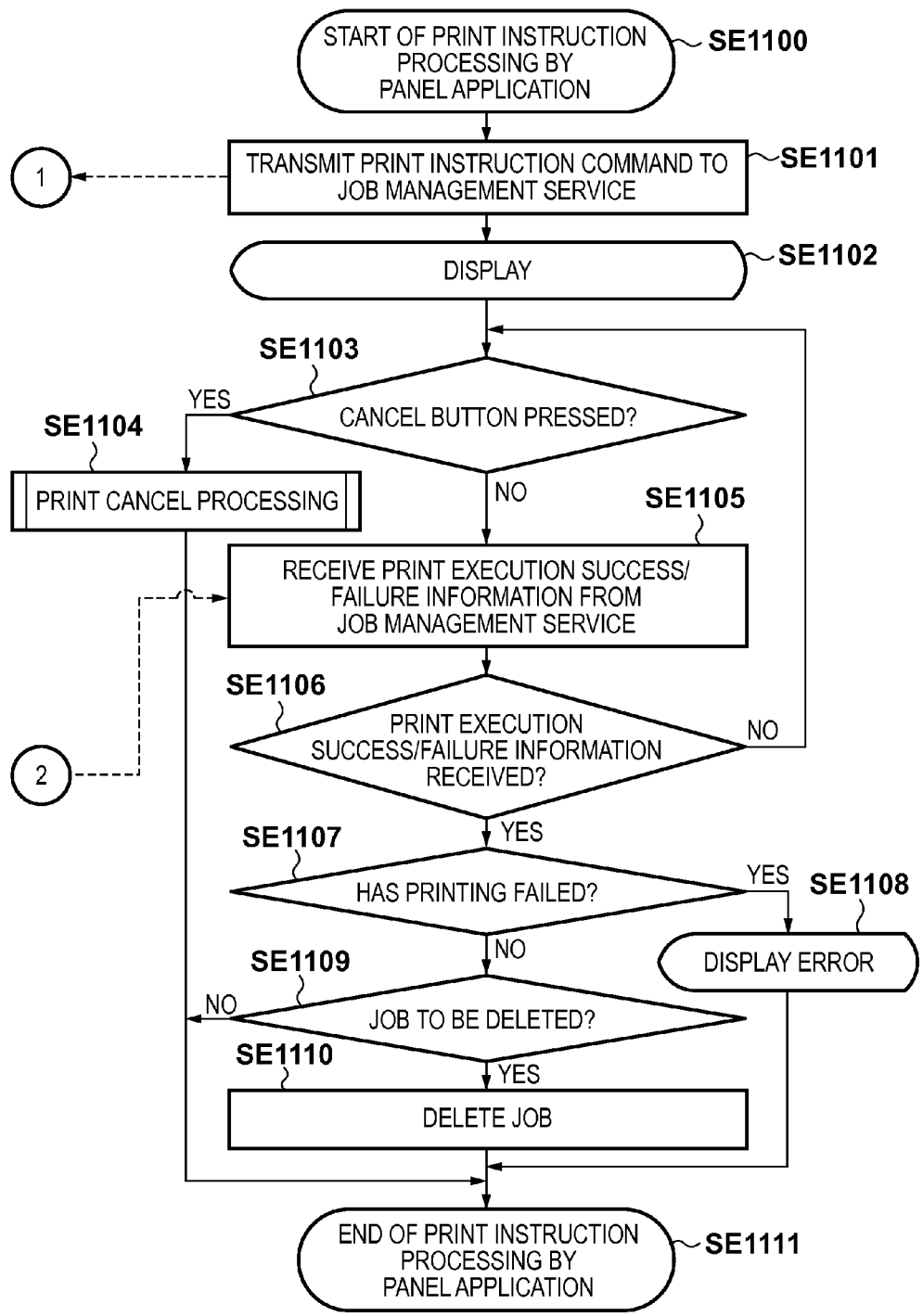

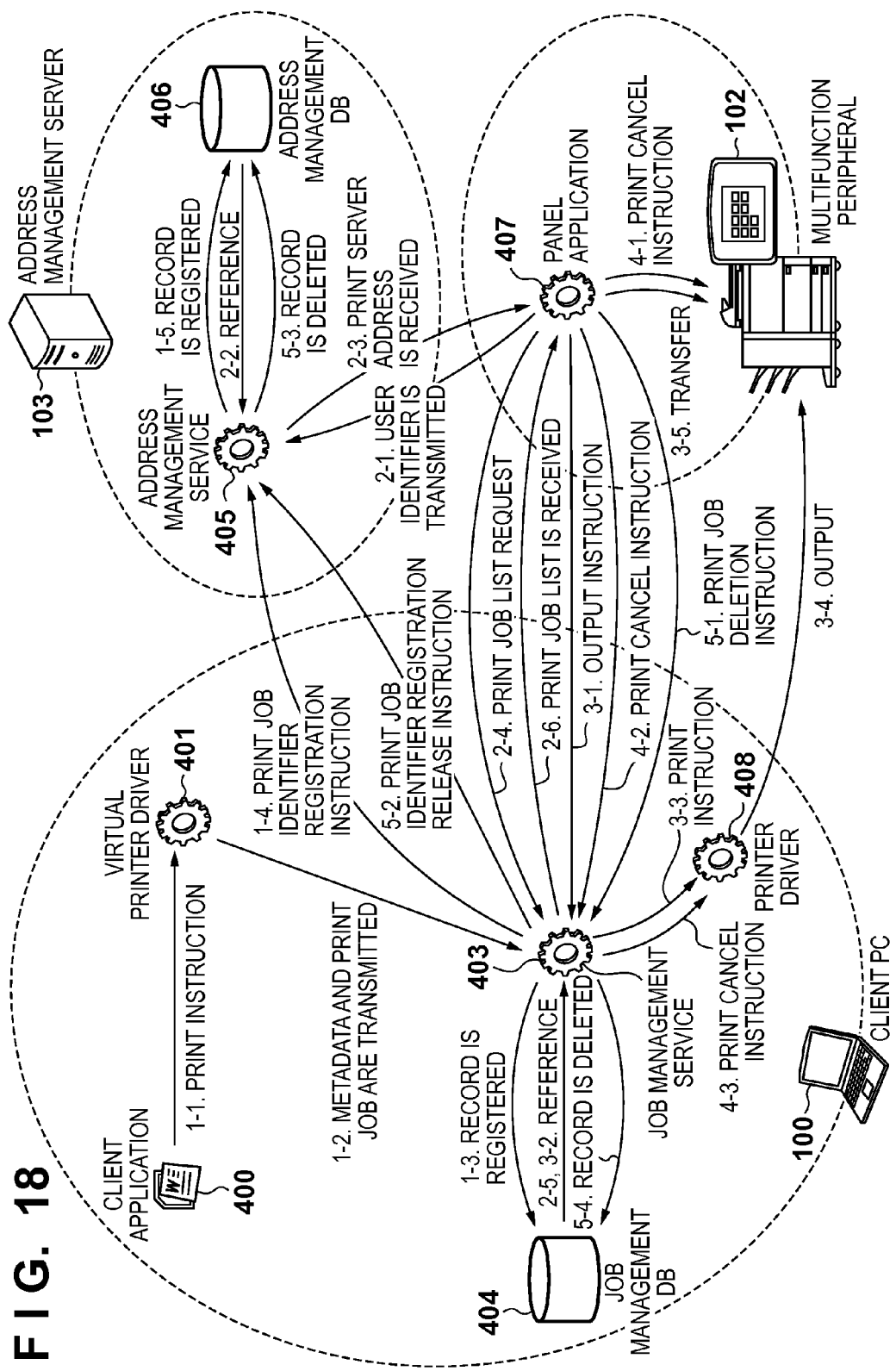
F I G. 18

F I G. 19
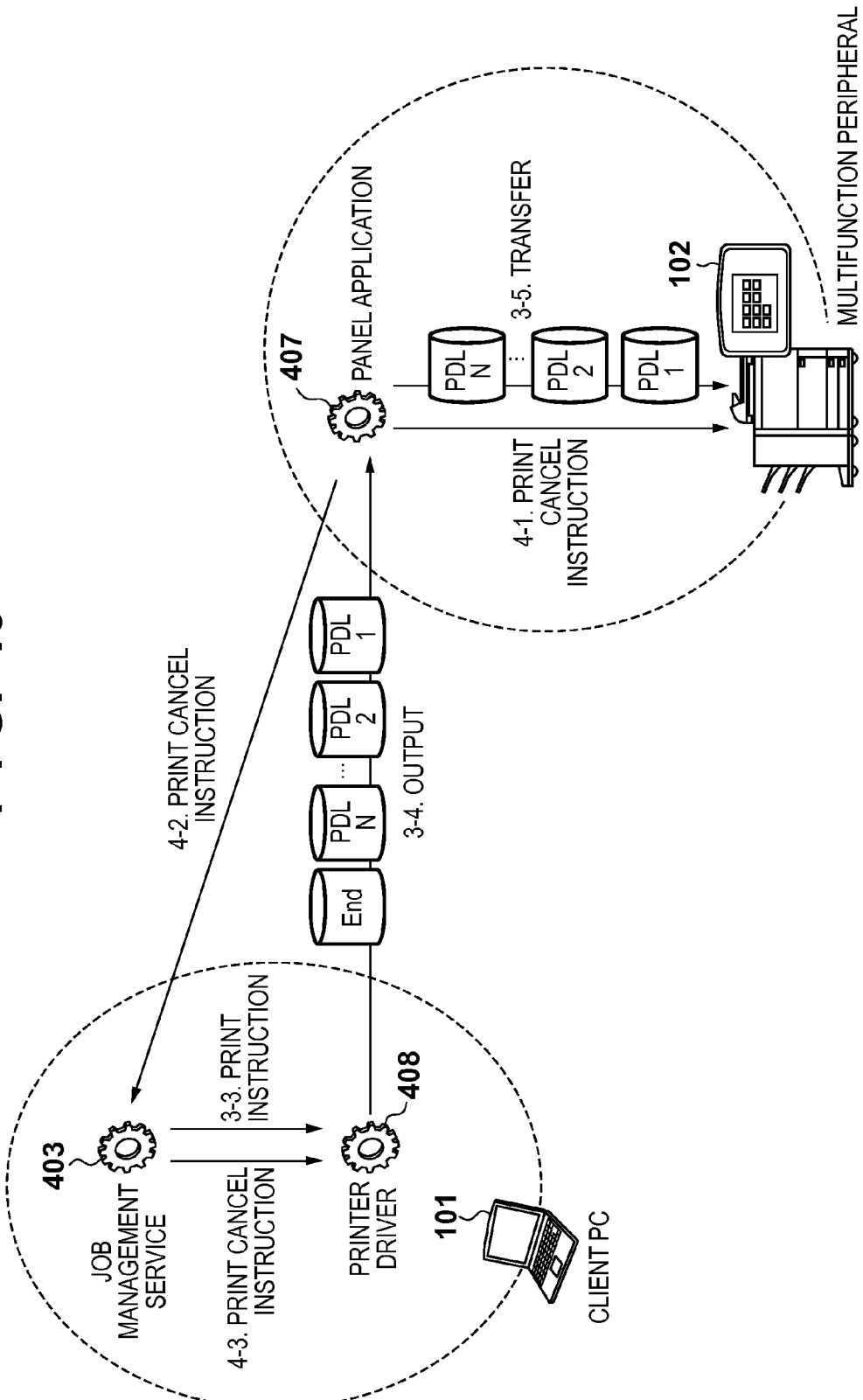

F I G. 20
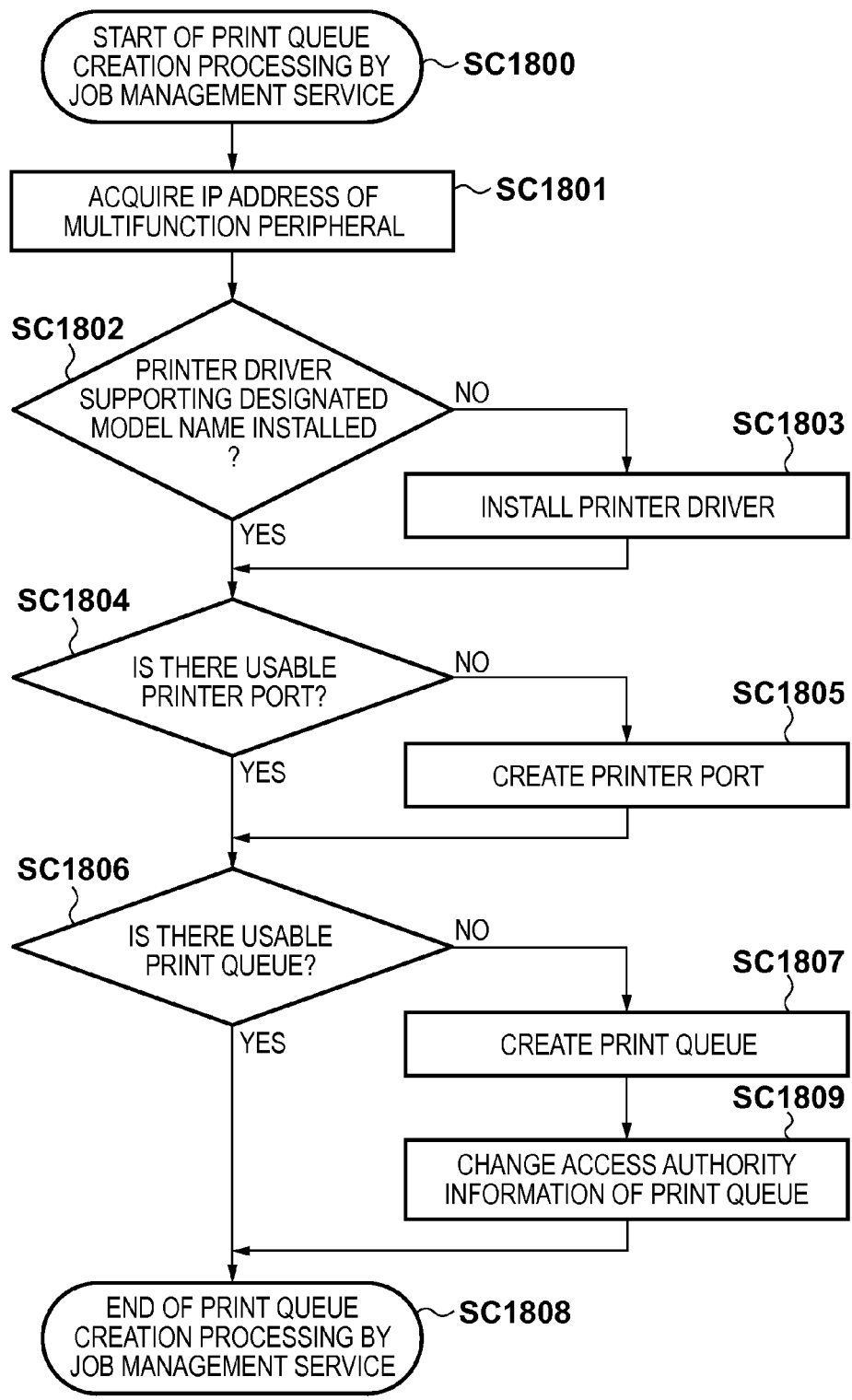

PRINTING SYSTEM, CONTROL METHOD, AND COMPUTER-READABLE MEDIUM FOR CONTROLLING PRINTING OF DATA STORED IN A PRINT SERVER

BACKGROUND OF THE INVENTION

1. Field of the Invention

The present invention relates to a printing system, control method, and computer-readable medium. Particularly, the present invention relates to a technique when an image forming apparatus controls printing of data stored in a print server.

2. Description of the Related Art

There has conventionally been proposed a so-called "pull print" printing system capable of outputting print data from a printing apparatus in response to a print request from a user to the printing apparatus for print data temporarily stored in a server (see, for example, Japanese Patent No. 4033857). This printing system allows the user to output print data not to a specific printing apparatus but from a printing apparatus of his choice in accordance with a print request in printing from an application.

Conventionally, it is difficult to instruct a change of print settings when the user issues a print request to a printing apparatus for print data temporarily stored in a server. This is because the format of print data temporarily stored in the server is PDL (Page Description Language) dependent on a printing apparatus. It is therefore conceivable to convert print data to be temporarily stored in the server into data of an intermediate format independent of a printing apparatus (device) so as to facilitate a change of print settings and the like. In this case, a pull print system is conceivable, in which, when the user changes settings from a printing apparatus and issues a print request, print data is generated using a printer driver corresponding to the printing apparatus on a server, and finally printed out.

Generally, when printing one document from an application, a printer driver generates one PDL job. However, some printer drivers generate a plurality of PDL jobs depending on print settings. For example, when printing a document of 20 pages by a device in which the number of sheets that can be stapled by a finisher is 10, the printer driver generates two PDL jobs for the first to 10th pages and the 11th to 20th pages.

If this printer driver is applied to the server of the pull print system, the number of PDL jobs to be generated from one print data of the intermediate format cannot be grasped in advance. When print cancel processing is performed after the start of transmitting PDL jobs to the printing apparatus upon a print instruction, all PDL jobs to be canceled may not be discriminated. Also, it is very difficult to derive from conditions the number of PDL jobs to be actually generated because it is determined by a plurality of factors such as a document to be printed, print settings, and the specifications of a printer driver and device.

SUMMARY OF THE INVENTION

The present invention provides a mechanism capable of properly performing print cancel processing even when a printer driver which may generate a plurality of PDL jobs is applied to the server of the above-mentioned pull print system.

According to one aspect of the present invention, there is provided a printing system comprising an image forming apparatus and a print server which stores data of an intermediate format, the print server including: a generation unit configured to generate a plurality of print jobs of a format corresponding to the image forming apparatus from the data of the intermediate format stored in the print server in accordance with a request from the image forming apparatus; an addition unit configured to add, to a series of data including the plurality of print jobs, termination data indicating a termination when outputting the plurality of print jobs generated by the generation unit to the image forming apparatus; and an output unit configured to output the series of data including the termination data to the image forming apparatus, and the image forming apparatus including: a receiving unit configured to receive the series of data from the print server; a transfer unit configured to transfer the plurality of print jobs included in the series of data to a printing unit of the image forming apparatus; and an accepting unit configured to accept a cancel instruction for the series of data from a user, wherein when the receiving unit accepts the cancel instruction while receiving the series of data, the receiving unit discards the plurality of print jobs until the termination data is received, and when the transfer unit accepts the cancel instruction while transferring the series of data, the transfer unit cancels transfer of the plurality of print jobs to the printing unit, and instructs the printing unit to cancel printing of a transferred print job.

According to another aspect of the present invention, there is provided a control method comprising: generating a plurality of print jobs of a format corresponding to an image forming apparatus from data of an intermediate format stored in a print server in accordance with a request from the image forming apparatus; adding, to a series of data including the plurality of print jobs, termination data indicating a termination when outputting, to the image forming apparatus, the plurality of print jobs generated in the generating a plurality of print jobs; outputting the series of data including the termination data to the image forming apparatus; receiving the series of data from the print server; transferring the plurality of print jobs included in the series of data to a printing unit of the image forming apparatus; and accepting a cancel instruction for the series of data from a user, wherein in the receiving, when the cancel instruction is accepted while the series of data is received, the plurality of print jobs are discarded until the termination data is received, and in the transferring, when the cancel instruction is accepted while the series of data is transferred, transfer of the plurality of print jobs to the printing unit is canceled, and the printing unit is instructed to cancel printing of a transferred print job.

According to another aspect of the present invention, there is provided a non-transitory computer-readable medium storing a program to be executed in a printing system including an image forming apparatus and a print server which stores data of an intermediate format, the program causing the print server to function as: a generation unit configured to generate a plurality of print jobs of a format corresponding to the image forming apparatus from the data of the intermediate format stored in the print server in accordance with a request from the image forming apparatus; an addition unit configured to add, to a series of data including the plurality of print jobs, termination data indicating a termination when outputting the plurality of print jobs generated by the generation unit to the image forming apparatus; and an output unit configured to output the series of data including the termination data to the image forming apparatus, and the program causing the image forming apparatus to function as: a receiving unit configured to receive the series of data from the print server; a transfer unit configured to transfer the plurality of print jobs included in the series of data to a printing unit of the image forming apparatus; and an accepting unit configured to accept a cancel instruction for the series of data from a user, wherein when the receiving unit accepts the cancel instruction while receiving the series of data, the receiving unit discards the plurality of print jobs until the termination data is received, and when the transfer unit accepts the cancel instruction while transferring the series of data, the transfer unit cancels transfer of the plurality of print jobs to the printing unit, and instructs the printing unit to cancel printing of a transferred print job.

The present invention can provide a mechanism capable of properly performing print cancel processing even when a printer driver which may generate a plurality of PDL jobs is applied to the server of the pull print system and performs print processing.

Further features of the present invention will become apparent from the following description of exemplary embodiments (with reference to the attached drawings).

BRIEF DESCRIPTION OF THE DRAWINGS

FIG. 2 is a block diagram exemplifying the hardware arrangement of an information processing apparatus;

FIG. 6 is a view exemplifying details of data to be handled in 1-2 of FIG. 4;

FIGS. 7A and 7B are views exemplifying details of data to be handled in 2-6 of FIG. 4;

FIG. 8 is a view exemplifying details of data to be handled in 3-1 of FIG. 4;

FIG. 10 is a view exemplifying a screen to be displayed on the display unit of the multifunction peripheral;

FIG. 11 is a view exemplifying a screen to be displayed on the display unit of the multifunction peripheral;

FIGS. 13A and 13B are flowcharts corresponding to print processing from 3-1 to 3-5 of FIG. 4;

FIG. 18 is a schematic view showing a pull print sequence in a printing system according to the second embodiment;

FIG. 19 is a schematic view showing part of a data flow according to the second embodiment;

FIG. 20 is a flowchart exemplifying print queue creation processing according to the second embodiment.

DESCRIPTION OF THE EMBODIMENTS

Embodiments of the present invention will now be described with reference to the accompanying drawings.

First Embodiment

Figure 1:
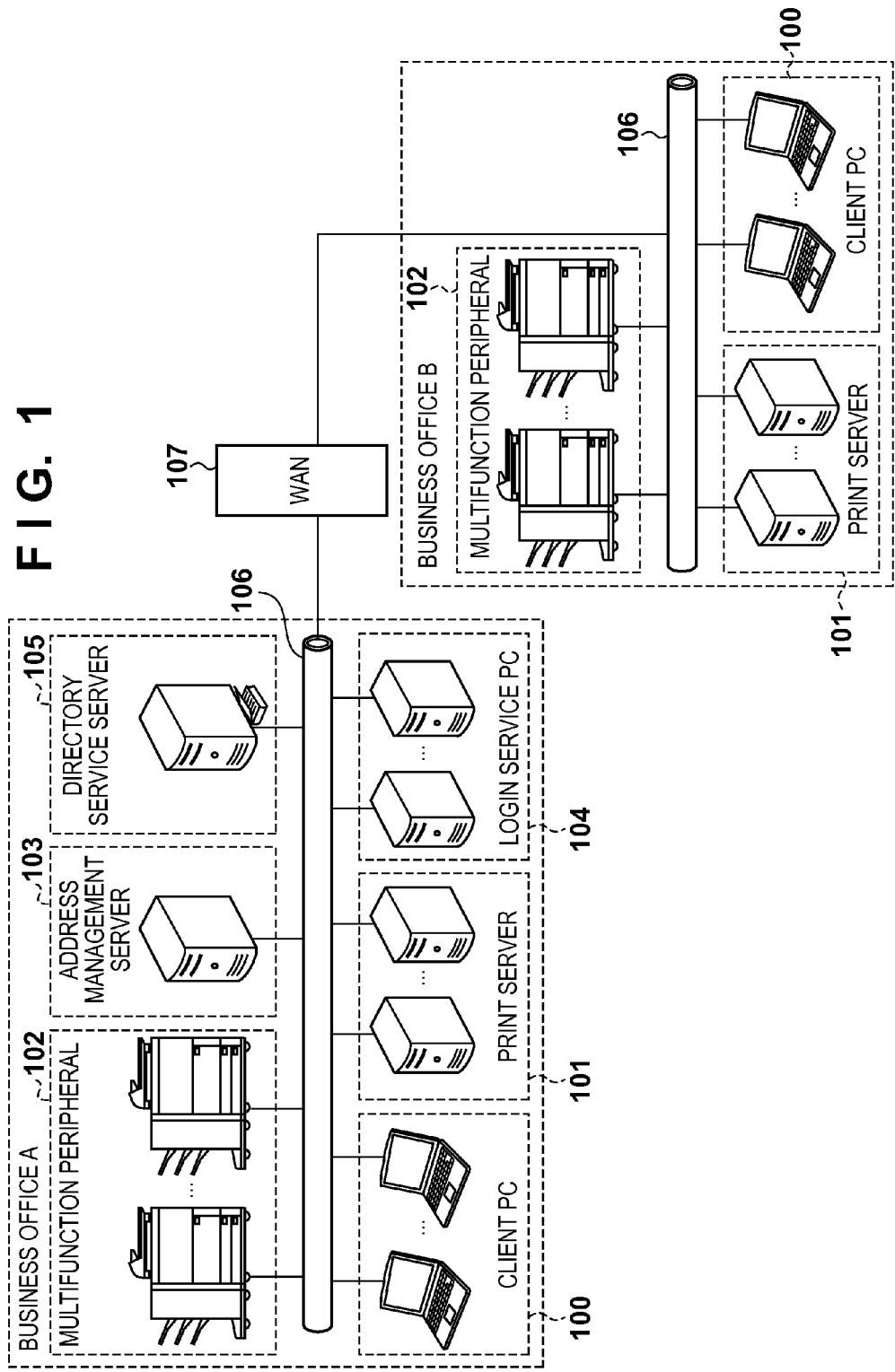
FIG. 1 is a view exemplifying the arrangement of a printing system.

[System Arrangement]
FIG. 1 is a view exemplifying the arrangement of a printing system to which the present invention is applicable. "Business office A" shown in FIG. 1 includes one or a plurality of client PCs 100, one or a plurality of print servers 101, one or a plurality of multifunction peripherals 102, an address management server 103, one or a plurality of login service PCs 104, and a directory service server 105. These apparatuses are connected via a local area network (LAN) 106. A plurality of apparatuses of the same type may be, for example, installed for respective users or arranged on respective floors.

A virtual printer driver is installed in the client PC 100. The virtual printer driver generates a print job of an intermediate format independent of a specific multifunction peripheral based on data received from a client application, and transmits it to the print server 101. Note that a print job of an intermediate format indicates print data of a format which has specifications about the format laid open to the public and facilitates reediting. Examples of the intermediate format are EMFSPOOL (Enhanced Metafile Spool Format), XPS (XML Paper Specification), and PDF (Portable Document Format). The embodiment will be explained using the EMFSPOOL format, but print data of another intermediate format such as XPS or PDF is also available.

The print server 101 saves a received print job in a predetermined storage location. The print server 101 includes a job management database (to be referred to as a job management DB hereinafter), and stores and manages metadata regarding the received print job in the job management DB. The print server 101 generates print job list data from the metadata recorded and managed in the job management DB, and transfers it to the multifunction peripheral 102. The print server 101 updates print setting information using the metadata recorded and managed in the job management DB and print setting information received from the multifunction peripheral 102, and controls to transfer the updated print settings to the multifunction peripheral 102. The print server 101 generates PDL (Printer Description Language) data from the print job saved in the predetermined storage location and the metadata recorded and managed in the job management DB, and transfers it to the multifunction peripheral 102.

The multifunction peripheral 102 is an image forming apparatus, includes the print function, and is also called an MFP (MultiFunction Peripheral). The multifunction peripheral 102 receives a PDL job transmitted from the print server 101, and executes processing based on the PDL job.

The address management server 103 includes an address management database (to be referred to as an address management DB hereinafter). When executing "pull print", the address management server 103 stores and manages, in the address management DB, the address and user identifier of the print server 101 which manages a print job. In response to a print job list request from the multifunction peripheral 102, the address management server 103 transmits, to the multifunction peripheral 102, the address of a print server 101 corresponding to a user identifier received from the multifunction peripheral 102.

The login service PC 104 performs, as a login service for the multifunction peripheral 102, authentication processing based on the login user name and password of the client PC 100 that are stored and managed in the directory service server 105. Authentication processing (Single Sign-On: SSO) is executed by, for example, a personal computer in which Security Agent available from CANON is installed. This password includes a login user name and password used in Microsoft Windows®.

The directory service server 105 unitarily stores and manages information about hardware resources such as a server, client, and printer on a network, and the attributes, access authorities, and the like of users of these hardware resources.

For example, the directory service server 105 corresponds to a server having an active directory function. Note that the user attributes include the login user name and password of the client PC 100.

The printing system of the embodiment is configured by connecting "business office A" having the above arrangement and "business office B" via a WAN 107. In "business office B", one or a plurality of client PCs 100, one or a plurality of print servers 101, and one or a plurality of multifunction peripherals 102 are connected via the LAN 106. Further, the printing system may be configured by connecting a plurality of "offices" having the same arrangement as that of "business office B" via the WAN 107.

[Hardware Arrangement (Information Processing Apparatus)]

The hardware arrangement of an information processing apparatus applicable to the client PC 100, print server 101, address management server 103, login service PC 104, and directory service server 105 shown in FIG. 1 will be explained with reference to FIG. 2. FIG. 2 is a block diagram showing the hardware arrangement of the information processing apparatus applicable to the client PC 100, print server 101, address management server 103, login service PC 104, and directory service server 105 shown in FIG. 1.

Referring to FIG. 2, a CPU 201 comprehensively controls devices and controllers connected to a system bus 204. A ROM 202 or external memory 211 stores a BIOS (Basic Input/Output System) and operating system program (to be referred to as an OS hereafter) serving as control programs for the CPU 201. The ROM 202 or external memory 211 also stores various programs (to be described later) and the like necessary to implement functions to be executed by each server or each PC. A RAM 203 functions as a main memory, work area, and the like for the CPU 201.

The CPU 201 loads, from the ROM 202 or external memory 211 into the RAM 203, programs and the like necessary to execute processing, and executes the loaded programs to implement various operations. An input controller 205 controls inputs from a keyboard 209, a pointing device such as a mouse (not shown), and the like. A video controller 206 controls display on a monitor 210. In general, the monitor 210 is a display such as a liquid crystal display or CRT. The administrator uses these devices, as needed.

A memory controller 207 controls access to the external memory 211 such as a hard disk (HD) which stores a boot program, various applications, font data, user files, edit files, various data, and the like. A communication I/F controller 208 connects/communicates with an external device via a network (for example, the LAN 106 shown in FIG. 1), and executes communication control processing on the network. For example, the communication I/F controller 208 allows communication using TCP/IP. Note that the CPU 201 enables display on the monitor 210 by executing, for example, outline font rasterization processing to a display information area in the RAM 203. The CPU 201 enables a user instruction with a mouse cursor (not shown) on the monitor 210.

Various programs (to be described later) for implementing the present invention are recorded in the external memory 211, and if necessary, loaded into the RAM 203 and executed by the CPU 201. The external memory 211 also stores definition files, various information tables, and the like used to execute the programs, details of which will be described later.

[Hardware Arrangement (Multifunction Peripheral)]

Figure 3:
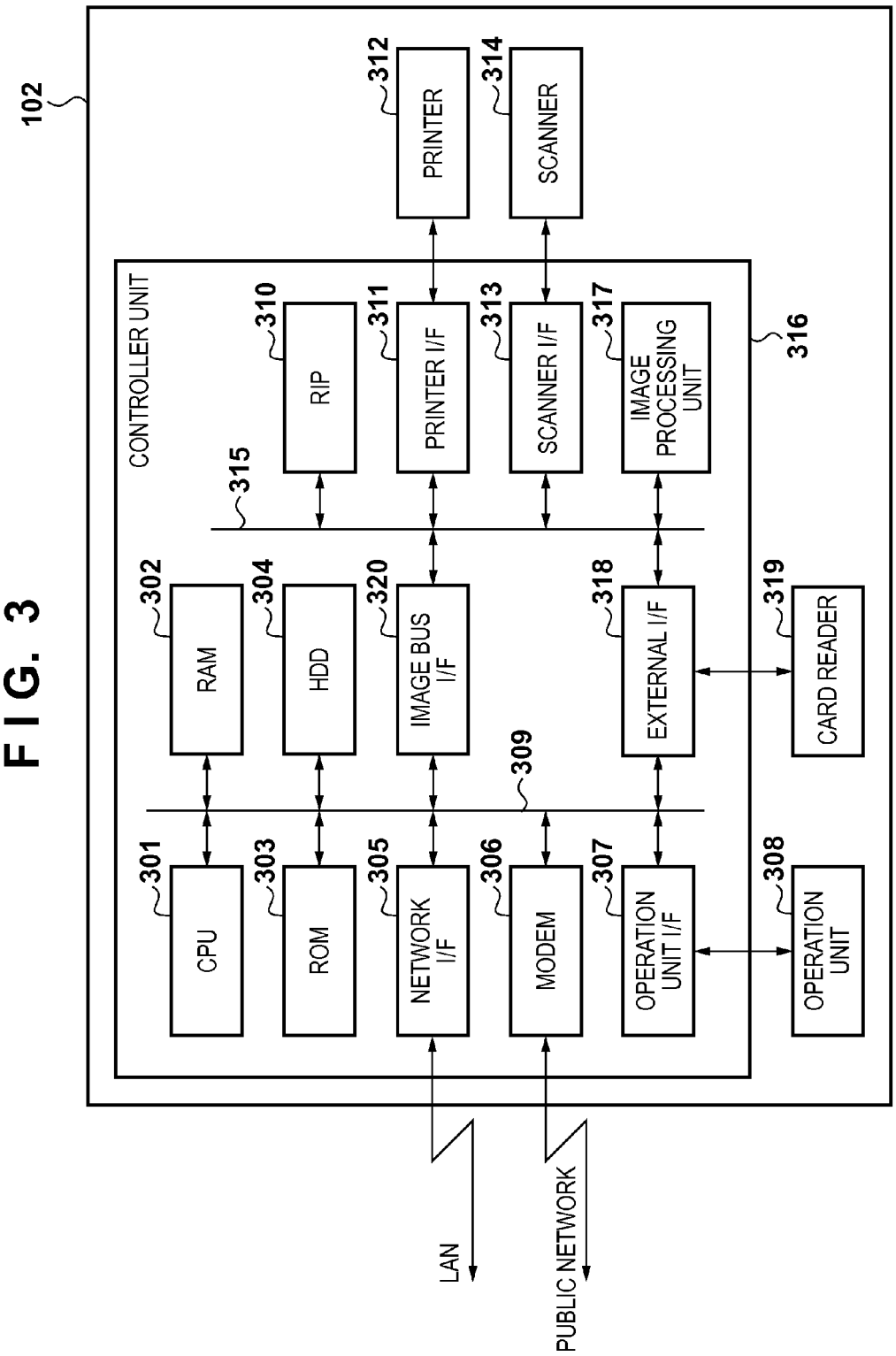
FIG. 3 is a block diagram exemplifying the hardware arrangement of a multifunction peripheral.

The hardware arrangement of a controller unit 316 which controls the multifunction peripheral 102 shown in FIG. 1 will be exemplified with reference to FIG. 3. Referring to FIG. 3, the controller unit 316 is connected to a scanner 314 functioning as an image input device and a printer 312 functioning as an image output device. In addition, the controller unit 316 is connected to a LAN (for example, the LAN 106 shown in FIG. 1) and a public line (WAN) (for example, PSTN or ISDN) to input/output image data and device information.

In the controller unit 316, a CPU 301 is a processor which controls the overall system. A RAM 302 is a system work memory necessary for the CPU 301 to run, and is also a program memory for recording programs and an image memory for temporarily recording image data. A ROM 303 stores a boot program and various control programs for the system. A hard disk drive (HDD) 304 stores various programs for controlling the system, image data, and the like.

An operation unit interface (operation unit I/F) 307 is an interface with an operation unit (UI) 308, and outputs, to the operation unit 308, image data to be displayed on the operation unit 308. Also, the operation unit I/F 307 notifies the CPU 301 of information (for example, user information) input by the user of the system via the operation unit 308. Note that the operation unit 308 includes a display unit (not shown) having a touch panel. The user can press (touch with his finger or the like) buttons displayed on the display unit to input various instructions.

A network interface (network I/F) 305 is connected to a network (LAN) to input/output data. A modem 306 is connected to a public line to perform data input/output such as FAX transmission/reception. An external interface (external I/F) 318 is an I/F unit which accepts an external input, such as a USB, IEEE1394, printer port, or RS-232C. In the embodiment, a card reader 319 is connected to the external I/F 318 to read an IC card necessary for authentication. The CPU 301 can control reading of information from the IC card by the card reader 319 via the external I/F 318, and acquire the information read from the IC card. These devices are arranged on a system bus 309.

An image bus interface (image bus I/F) 320 is a bus bridge which connects the system bus 309 and an image bus 315 for transferring image data at high speed, and converts the data structure. The image bus 315 is formed from a PCI bus or IEEE1394 bus. The following devices are arranged on the image bus 315. A raster image processor (RIP) 310 rasterizes vector data such as a PDL code into a bitmap image.

A printer interface (printer I/F) 311 connects the printer 312 and controller unit 316, and performs synchronous/asynchronous conversion of image data. A scanner interface (scanner I/F) 313 connects the scanner 314 and controller unit 316, and performs synchronous/asynchronous conversion of image data. An image processing unit 317 performs correction, processing, and editing for input image data, and performs printer correction, resolution conversion, and the like for printout image data. In addition, the image processing unit 317 rotates image data, and compresses/decompresses multi-valued image data by JPEG or binary image data by JBIG, MMR, MH, or the like.

The scanner 314 illuminates an image on a document sheet, scans it with a CCD line sensor, and converts it into an electrical signal as raster image data. The user sets document sheets in the tray of a document feeder (not shown), and designates the start of reading from the operation unit 308. Then, the CPU 301 gives an instruction to the scanner 314, and the document feeder feeds the document sheets one by one and reads document images. The printer 312 converts raster image data into an image on a sheet. The printer 312 employs, for example, an electrophotographic method using a photosensitive drum or photosensitive belt, or an inkjet method of discharging ink from a small nozzle array to directly print an image on a sheet. However, the method is arbitrary.

The print operation starts in response to an instruction from the CPU 301. Note that the printer 312 includes a plurality of sheet feed stages and sheet cassettes corresponding to them so that the user can select different sheet sizes or different sheet orientations. The operation unit 308 includes an LCD display unit (not shown), and a touch panel sheet is adhered onto the LCD. The operation unit 308 displays a system operation screen, and when the user presses a displayed key, notifies the CPU 301 via the operation unit I/F 307 of the position information. The operation unit 308 includes various operation keys such as a start key, stop key, ID key, and reset key. The start key of the operation unit 308 is used to, for example, start a document image reading operation. The start key may include an LED in two, green and red so that the color represents whether the start key is usable. The stop key of the operation unit 308 is used to stop a running operation.

The ID key of the operation unit 308 is used to input the user ID of a user. The reset key is used to initialize settings made via the operation unit 308. The card reader 319 reads information stored in an IC card (for example, FeliCa® available from Sony) under the control of the CPU 301, and notifies the CPU 301 via the external I/F 318 of the read information. With this arrangement, the multifunction peripheral 102 can transmit image data scanned by the scanner 314 to the LAN 106, and control the printer 312 to print out print data received via the LAN 106. Also, the multifunction peripheral 102 can FAX-send image data scanned by the scanner 314 to the public line via the modem 306, and control the printer 312 to output image data FAX-received from the public line.

[Pull Print Sequence]

An overall pull print sequence in the printing system according to the embodiment will be explained with reference to FIG. 4. Before this, preconditions to execute pull print in the embodiment will be explained.

A virtual printer driver 401 for implementing pull print in the embodiment is installed as a shared printer in the print server 101. The virtual printer driver 401 generates print data based on designated printing or output of a rendering command from a client application 400. Further, the virtual printer driver 401 has a function (user interface) of making print settings for controlling the functions of the virtual printer driver 401 and multifunction peripheral 102, and a function of storing the print settings in an external storage device for each installed print queue.

The print settings are stored in a DEVMODE structure for Windows® available from Microsoft, USA. The DEVMODE structure is defined by Microsoft, USA to store various settings including default operation conditions regarding the print queue, such as functions usable by a printer, layout settings, finishing settings, sheet feed/discharge settings, and print quality settings. The DEVMODE structure is stored in the external storage device for each installed print queue. The virtual printer driver 401 is downloaded and installed from the print server 101 by point & print or the like, and a print queue for the virtual printer driver 401 is added to the client PC 100.

The client application 400 is not particularly limited and corresponds to, for example, an application for creating data to undergo print processing.

An overall pull print sequence according to the embodiment will be explained. FIG. 4 is a schematic view for explaining an overall pull print sequence in the printing system according to the embodiment. As shown in FIG. 4, first, the user logs in to the client PC 100, and inputs a print instruction from the client application 400 executed in the client PC 100 to a print queue corresponding to the virtual printer driver 401 (1-1).

Figure 5:
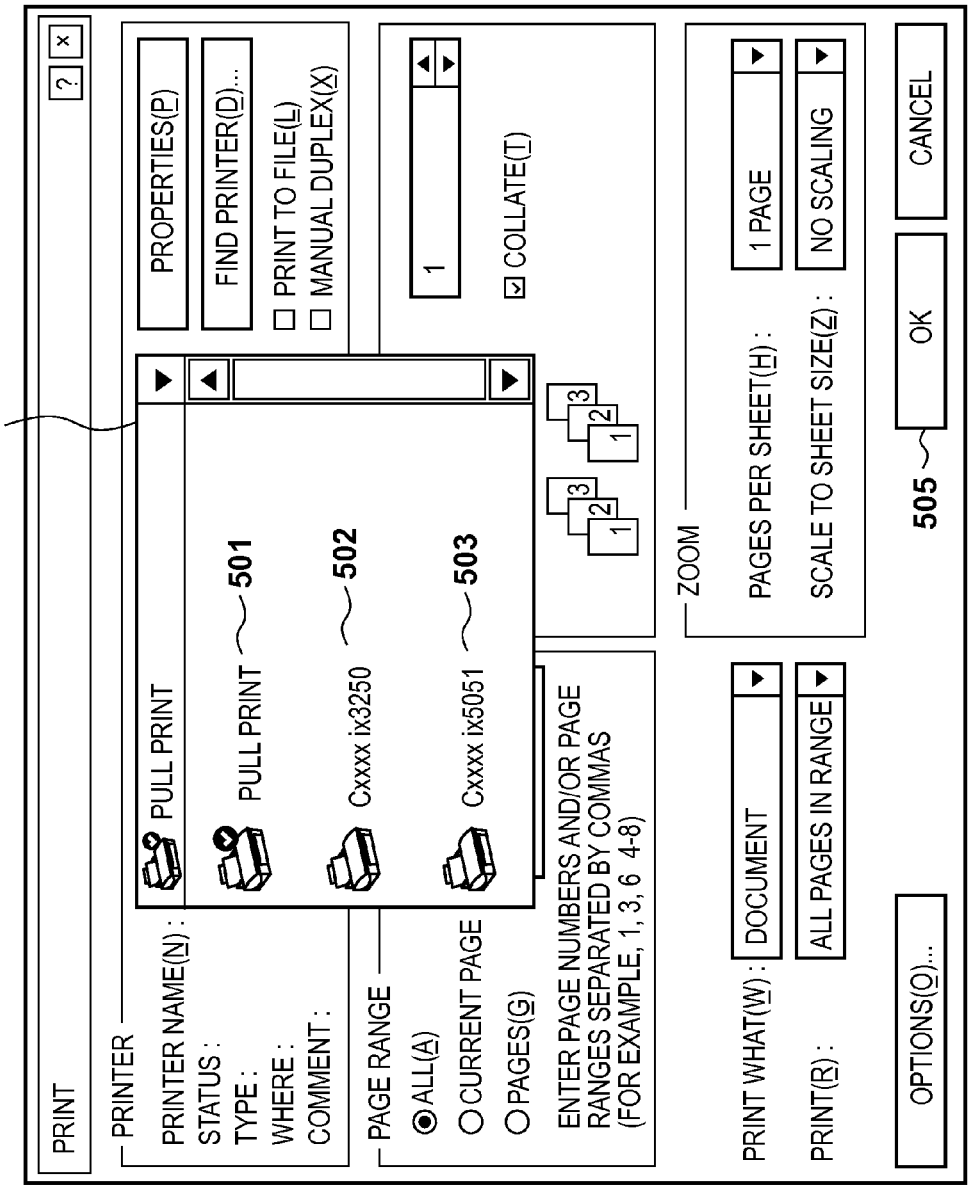
FIG. 5 is a schematic view exemplifying a printing screen provided by an application program.

FIG. 5 is a schematic view exemplifying a printing screen provided by the client application 400 at this time. A printer selection portion 510 is used to select a print queue to print, from print queues corresponding to multifunction peripherals set in the client PC 100. At the printer selection portion 510, "Pull Print" 501 is a print queue corresponding to the virtual printer driver 401 having the pull print setting according to the embodiment. Further, "Cxxxx ix3250" 502 and "Cxxxx ix5051" 503 are print queues corresponding to general printer drivers. The user selects one of the print queues from the printer selection portion 510, and designates an OK button 505 with a pointing device or the like. Then, the client application 400 transmits data to be printed to a printer driver corresponding to the print queue selected from the printer selection portion 510 via a graphic engine. In the embodiment, the user selects the "Pull Print" 501 from the printer selection portion 510, and issues a print instruction (1-1).

Figure 4:
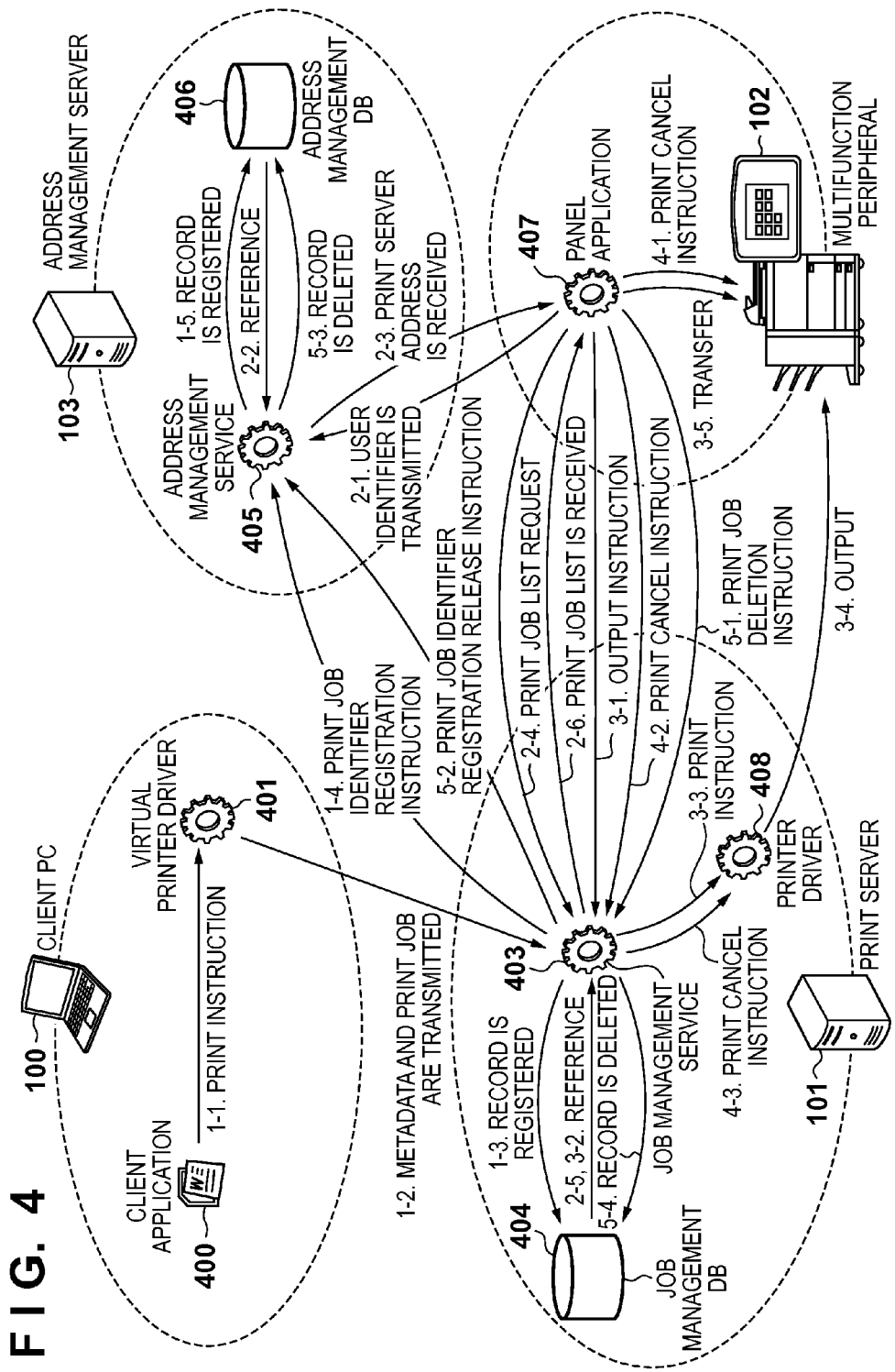
FIG. 4 is a schematic view showing a pull print sequence in the printing system according to the first embodiment.

Referring back to the description of FIG. 4, in accordance with the print instruction via the printing screen shown in FIG. 5, the client application 400 of the client PC 100 transmits data to the virtual printer driver 401 via a graphic engine (not shown). The virtual printer driver 401 of the client PC 100 generates a print job of the device-independent EMF-SPOOL format and metadata based on the data received from the client application 400 via the graphic engine.

Note that the metadata used in the embodiment is expressed in the XML format as shown in FIG. 6. The Guid attribute of the JobInfo element describes a print job identifier which is unique in the printing system according to the embodiment. The JobName attribute of the JobInfo element describes the name of a print job. The UserName attribute of the JobInfo element describes the name of a user who instructed execution of printing. The PrintQueueName attribute of the JobInfo element describes the name of a print queue. The DevmodeSnapshot attribute of the DocumentSettings element describes the print setting (DEVMODE) of the first page. Note that DEVMODE is a binary format, and thus is converted into a text by a Base64 method to describe data by XML.

Referring back to the description of FIG. 4, the virtual printer driver 401 transmits the generated print job of the EMFSPOOL format and the generated metadata to a job management service 403 in the print server 101 (1-2). The job management service 403 saves the print job of the EMF-SPOOL format in a predetermined storage location in the print server 101, and registers the metadata in a job management DB 404 (built in the external storage device of the print server 101) (1-3). At this time, the print server 101 only saves the print job in the predetermined storage location, and does not transmit it to the printing apparatus (multifunction peripheral 102). The print server 101 transmits the identifier of the print job and a user identifier to an address management service 405 in the address management server 103 to register them in the address management service 405 (1-4). Upon receiving the print job identifier and user identifier from the job management service 403, the address management service 405 registers them in an address management DB 406 (built in the external storage device of the address management server 103) in addition to the address of the print server 101 (1-5). Note that the embodiment uses the IP address of each device as an address for discriminating the device.

Figure 9A:
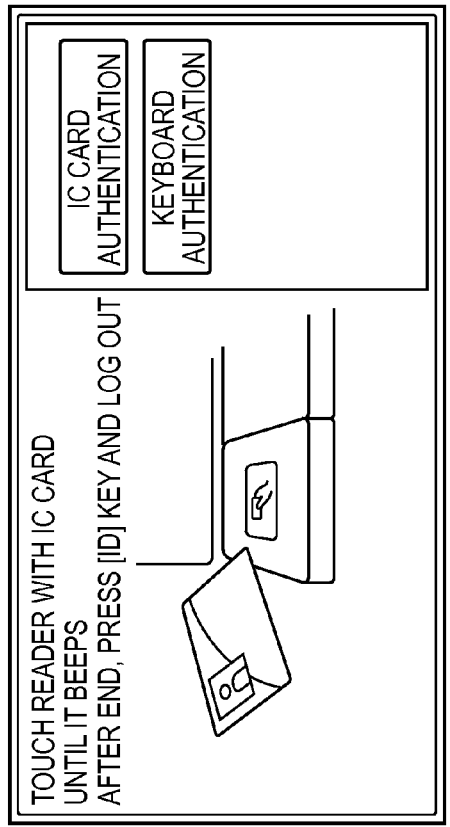
FIGS. 9A, 9B, 9C, and 9D are views each exemplifying a screen to be displayed on the display unit of the multifunction peripheral.

The multifunction peripheral 102 controls to display a login display screen (FIG. 9A) on the display unit of the operation unit 308. When the card reader 319 detects a readable IC card, it reads individual authentication information in the IC card. The multifunction peripheral 102 transmits the read individual authentication information as an authentication request to an authentication server (not shown). The individual authentication information is information used for authentication and may be the serial number of the IC card or the like.

Figure 9B:
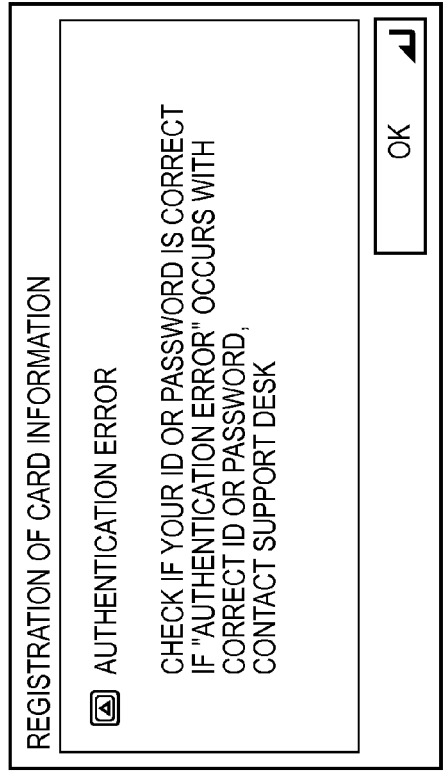

Upon receiving the individual authentication information from the multifunction peripheral 102, the authentication server (not shown) performs authentication processing for the received individual authentication information based on an IC card authentication table stored in the external storage device of the authentication server. Then, the authentication server sends back the result of authentication of the received individual authentication information to the multifunction peripheral 102. At this time, if the authentication processing has succeeded, the authentication server transmits the user identifier of the client PC 100 as the authentication result. If the authentication has failed, the authentication server causes the client PC 100 to display an authentication error screen as shown in FIG. 9B. Note that the function of the authentication server need not always be arranged in a physically separate apparatus, and may be included in the address management server 103.

A panel application 407 in the multifunction peripheral 102 receives the authentication result (login user identifier of the client PC 100) representing that the authentication has succeeded. The embodiment uses a user name as the user identifier. Needless to say, the method for identifying a user may be the serial number of an IC card. Before requesting a print job list of the print server 101, the panel application 407 executes pre-processing to acquire the IP address of the print server 101. After the pre-processing, the panel application 407 transmits the user identifier to the address management service 405 in the address management server 103 (2-1).

The address management service 405 acquires the IP address of a print server 101 corresponding to the received user identifier (2-2). Then, the address management service 405 sends back the IP address of the print server 101 to the panel application 407 (2-3). Upon receiving the IP address of the print server 101 from the address management service 405, the panel application 407 requests a print job list of the job management service 403 in the print server 101 (2-4). The job management service 403 refers to the job management DB 404 to meet the received print job list request (2-5). The job management service 403 then generates a print job list corresponding to the user identifier, and sends back the print job list to the panel application 407 (2-6).

The generated print job list is expressed in the XML format as shown in FIGS. 7A and 7B. The JobList element holds JobInfo child elements by the number of print jobs. In the example shown in FIGS. 7A and 7B, seven print jobs are described. The Guid attribute of the JobInfo element is the same as Guid described with reference to FIG. 6. The Job-Name attribute of the JobInfo element is also the same as JobName described with reference to FIG. 6. The CopyCount attribute designates a copy count. The Duplexing attribute designates which of one-sided printing and two-sided printing is used. More specifically, a description "OneSided" designates one-sided printing. A description "TwoSided-LongEdge" designates two-sided (long-edge binding). A description "TwoSidedShortEdge" designates two-sided (short-edge binding). The OutputColor attribute designates an output method regarding color. A description "Color" designates color. A description "Monochrome" designates monochrome. The PagesPerSheet attribute designates a page count which can be selected to print on one surface of a sheet at the selected page count. The DateTime attribute designates the job input time.

Referring back to the description of FIG. 4, upon receiving the print job list from the job management service 403, the panel application 407 displays the print job list on the UI of the operation unit 308 (FIG. 10).

When the panel application 407 accepts selection of a print job and pressing of a "print" button 922 from the user on a print job list display screen of FIG. 10, it controls to display a print setting change screen (FIG. 11) on the display unit of the operation unit 308. In FIG. 11, a setting 931 indicates designation of a color mode, and allows the user to check either monochrome or color. In FIG. 11, a setting 932 indicates designation of two-sided/one-sided, and allows the user to select one of one-sided, two-sided (long-edge binding), and two-sided (short-edge binding). In FIG. 11, a setting 933 indicates designation of pages per sheet, and allows the user to select one of 1in1, 2in1, 4in1, 6in1, 8in1, 9in1, and 16in1. In FIG. 11, a setting 934 indicates designation of a copy count, and allows the user to designate a value of 1 to 9,999.

Referring back to the description of FIG. 4, when the panel application 407 accepts a change of print settings and pressing of a button 937 for instructing the start of printing on the print setting change screen of FIG. 11, it transmits print setting information and issues a print request (output instruction) to the job management service 403 (3-1). In the embodiment, the print setting information is expressed in the XML format as shown in FIG. 8. The Guid attribute of the JobInfo element is the same as Guid described with reference to FIG. 6. The DeviceModelName attribute of the JobInfo element describes the model name of the multifunction peripheral 102 in FIG. 1. Various attributes held by the DocumentSettings element are the same as those described with reference to FIGS. 7A and 7B.

Referring back to the description of FIG. 4, upon receiving the print setting information and print instruction from the panel application 407, the job management service 403 acquires information necessary for printing by referring to the job management DB 404 (3-2). Based on the print instruction and referred information, the job management service 403 generates a PDL job, and instructs a printer driver 408 to execute print processing for the print job (3-3). Based on the print processing execution instruction, the printer driver 408 transmits the PDL job to the panel application 407 (3-4). The panel application 407 transfers the received PDL job to a processing unit in the multifunction peripheral 102 (3-5).

Next, a sequence when the user issues a print cancel instruction to the panel application 407 during print processing for a print job will be explained. When the user issues a print job cancel instruction to the panel application 407, the panel application 407 issues a print cancel instruction to the multifunction peripheral 102 (4-1). Further, the panel application 407 issues a print cancel instruction to the job management service 403 in the print server 101 (4-2). Upon receiving the print cancel instruction, the job management service 403 issues a print cancel instruction to the printer driver 408 which generates and transmits a PDL job (4-3).

Finally, when the panel application 407 accepts pressing of an erase button 921 in FIG. 10 by the user, it instructs the job management service 403 to delete the designated print job (5-1). Alternatively, when the panel application 407 accepts an instruction by the user via a printed document erase check box 935 in FIG. 11, it instructs the job management service 403 to delete the designated print job (5-1).

Upon receiving the print job deletion request from the panel application 407, the job management service 403 first instructs the address management service 405 to release registration of a registered print job identifier (5-2). Upon receiving the print job identifier registration release request from the job management service 403, the address management service 405 deletes a corresponding record from the address management DB 406 (5-3). After that, the job management service 403 deletes a corresponding record from the job management DB 404 (5-4). At this time, the job management service 403 also deletes a print job file of the EMFSPOOL format.

[Characteristic Processing Sequence of Invention]

Figure 12:
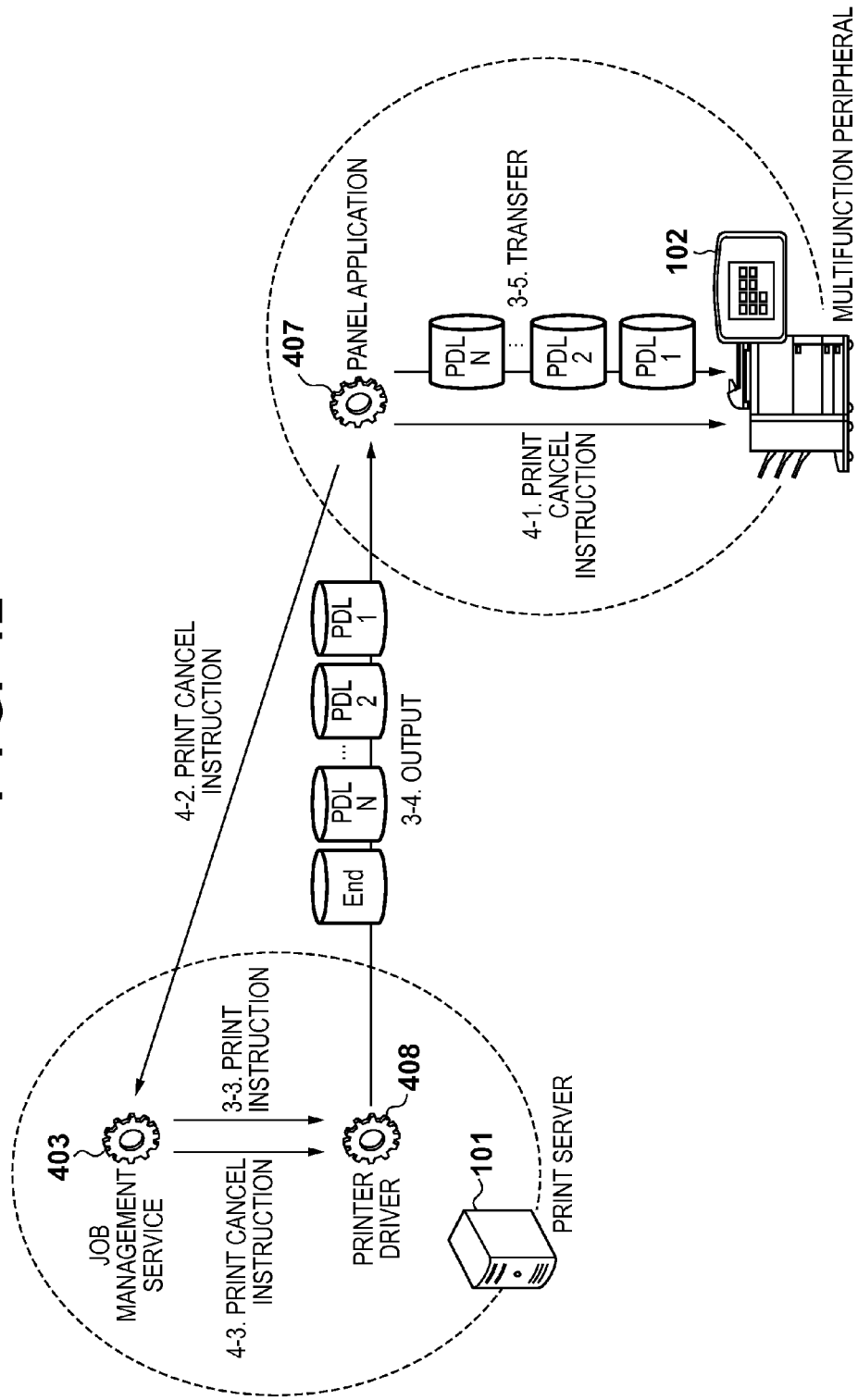
FIG. 12 is a schematic view showing part of a data flow according to the first embodiment.

The sequence of the overall printing system has been described with reference to FIG. 4 from the viewpoint of a data flow. FIG. 12 shows a most characteristic data flow in the embodiment that is extracted from FIG. 4. When the job management service 403 instructs execution of printing (3-3), the printer driver 408 outputs a plurality of PDL jobs from data corresponding to a single print job designated by the user in 3-4. For example, when the number of sheets which can be stapled by the finisher (not shown) of the multifunction peripheral 102 is 10, and a document of 20 pages is to be printed, the printer driver 408 generates two PDL jobs for the first to 10th pages and the 11th to 20th pages.

Further, the printer driver 408 adds, to the end of a series of jobs formed from a plurality of PDL jobs, a special End job meaning the termination of the PDL jobs. The End job is identical in format to a normal PDL job. However, the End job is neither a job for printing out and discharging a sheet, nor a job to be charged. The End job is merely termination data serving as the mark of a termination (End) meaning the end of a series of jobs formed from a plurality of PDL jobs. Note that a print job identifier represented by the Guid attribute in FIG. 8 is embedded in all these PDL jobs and the End job indicating the termination of the jobs. In print cancel processing from 4-1 to 4-3 shown in FIG. 12, a job to be canceled can be determined from the print job identifier.

In 3-5, the printer driver 408 does not directly transmit the PDL jobs and End job to the multifunction peripheral 102. Instead, the panel application 407 temporarily receives all the PDL jobs, removes the End job, and the transfers the remaining PDL jobs to the multifunction peripheral 102 (so-called local loopback). By this processing, software of the main body of the multifunction peripheral 102 need not cope with the End job.

[Relationship Between Job Delimiter and End Job]

Figure 21:
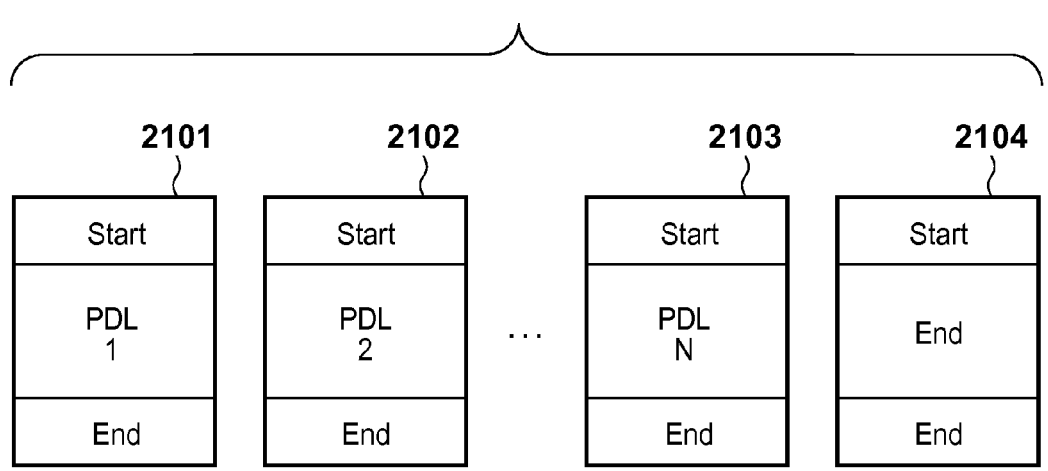
FIG. 21 is a view showing the relationship between a job delimiter and an End job.

Each job is defined by pieces of information representing the start and end of the job, respectively, as shown in FIG. 21. In the example of FIG. 21, a first PDL job 2101 to Nth PDL job 2103 and an End job 2104 are transmitted as a series of jobs. The respective jobs can be discriminated because each of the first PDL job 2101 to Nth PDL job 2103 and the End job 2104 is defined by information (start) representing the start of the job and information (end) representing the end of the job. That is, the End job 2104 is also defined by information (start) representing the start of the job and information (end) representing the end of the job, similar to the remaining jobs.

The multifunction peripheral 102 can recognize the delimiter of each job based on the information (end) representing the end of the job, and recognize the end of a series of jobs based on the End job 2104.

[Processing Sequence]

Figure 13A:
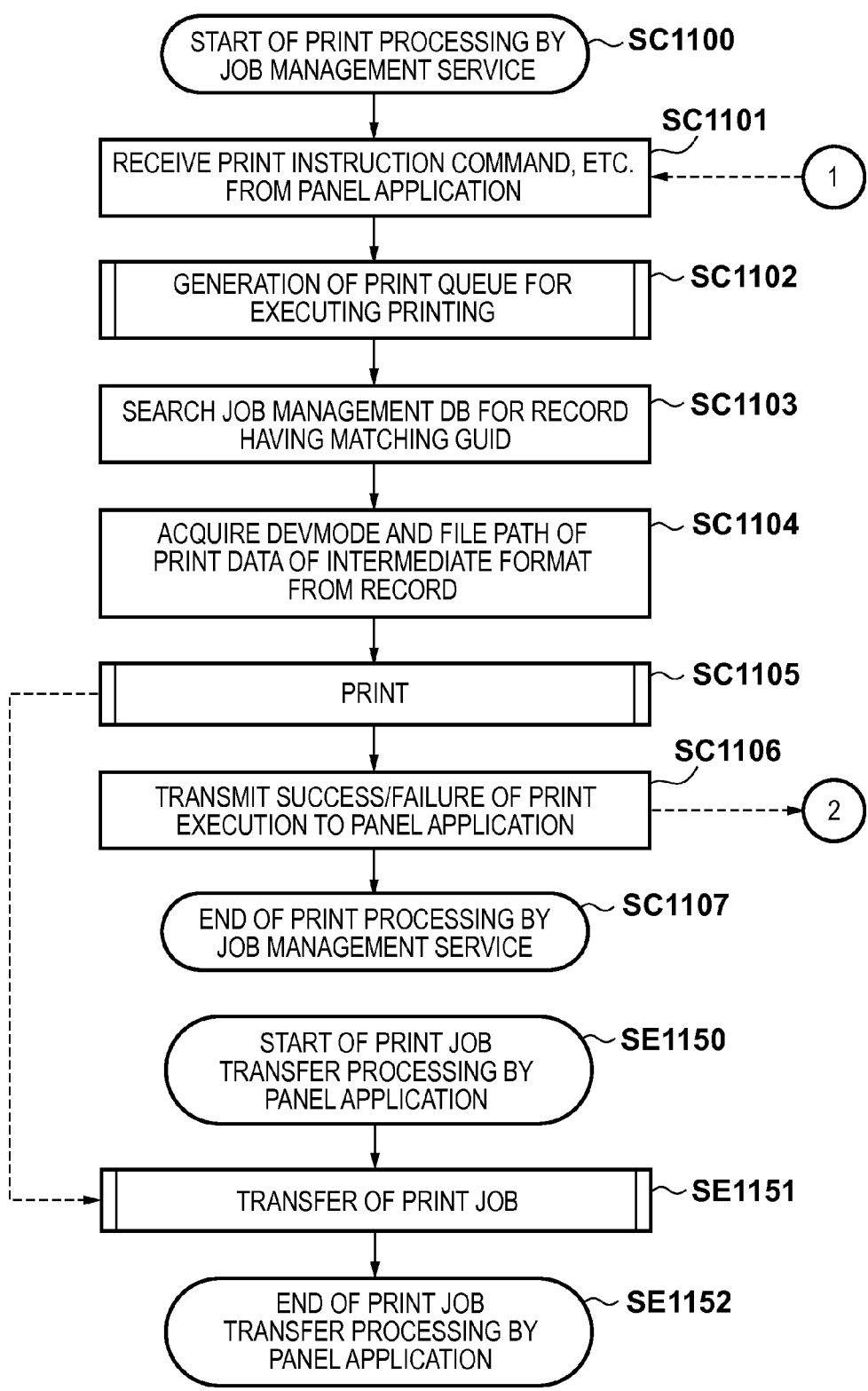

FIGS. 13A and 13B are flowcharts corresponding to the print processing sequence from 3-1 to 3-5 shown in FIG. 4. In this processing sequence, broken arrows indicate data flows between the apparatuses.

Steps SE1100 to SE1111 correspond to print instruction processing by the panel application 407 shown in FIG. 4. These flowchart processes are implemented by loading a program stored in the external memory into the RAM and executing it by the CPU of the multifunction peripheral 102 shown in FIG. 1.

Steps SC1100 to SC1107 correspond to print processing by the job management service 403 shown in FIG. 4. These flowchart processes are implemented by loading a program stored in the external memory into the RAM and executing it by the CPU of the print server 101 shown in FIG. 1.

Steps SE1150 to SE1152 correspond to job transfer processing by the panel application 407 shown in FIG. 4. These flowchart processes are implemented by loading a program stored in the external memory into the RAM and executing it by the CPU of the multifunction peripheral 102 shown in FIG. 1. Note that the panel application 407 running in steps SE1150 to SE1152 and the panel application 407 running in steps SE1100 to SE1107 operate asynchronously in separate processes.

Figure 9C:
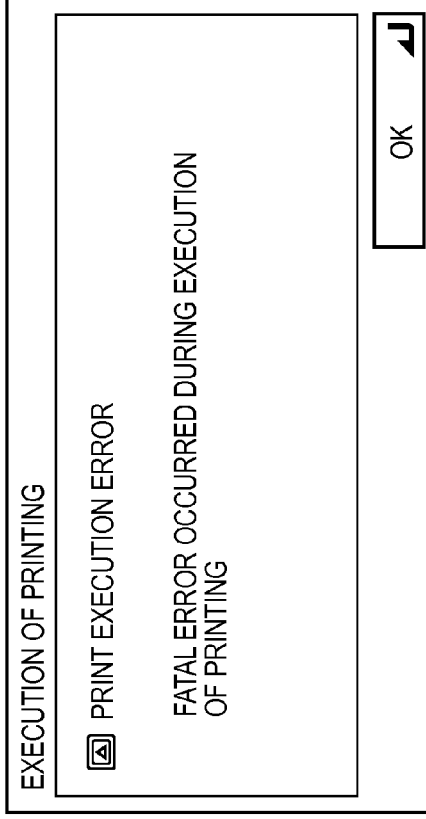
Figure 9D:
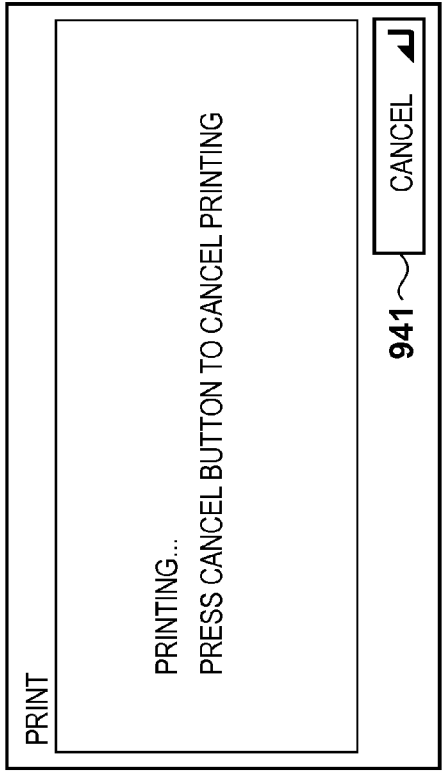

First, print instruction processing by the panel application 407 will be explained. In step SE1100, the processing by the panel application 407 starts. In step SE1101, the panel application 407 transmits a print instruction request command to the job management service 403. At this time, the panel application 407 also transmits print setting information (FIG. 8) including a selected print job identifier and the model name of the multifunction peripheral 102. In step SE1102, the panel application 407 controls to display a printing display screen (FIG. 9D) on the display unit of the operation unit 308. In the embodiment, an instruction to cancel a job is accepted from the user via a cancel button 941 shown in FIG. 9D. However, the accepting unit for cancellation of a job is not limited to this, and cancellation may be accepted by another method.

In step SE1103, the panel application 407 determines whether pressing of the cancel button 941 in the printing display screen (FIG. 9D) has been accepted. If the pressing has been accepted (YES in step SE1103), the panel application 407 closes the printing display screen (FIG. 9D) and then executes print cancel processing in step SE1104, details of which will be described later with reference to FIG. 15. After that, the process advances to step SE1111.

If the pressing of the cancel button 941 has not been accepted (NO in step SE1103), the process advances to step SE1105. In step SE1105, if the job management service 403 transmits a print execution result (success/failure), the panel application 407 receives the print execution result (success/failure). In step SE1106, the panel application 407 determines whether the job management service 403 has transmitted the print execution result (success/failure). If the panel application 407 determines that the job management service 403 has transmitted the print execution result (success/failure) (YES in step SE1106), it closes the printing display screen (FIG. 9D), and the process advances to step SE1107. If the panel application 407 determines that the job management service 403 has not transmitted the print execution result (success/failure) (NO in step SE1106), the process returns to step SE1103.

In step SE1107, the panel application 407 determines whether execution of printing has succeeded. If execution of printing has failed (YES in step SE1107), the process advances to step SE1108, and the panel application 407 controls to display an error display screen (FIG. 9C) on the display unit of the operation unit 308. The process then advances to step SE1111. If the panel application 407 determines that execution of printing has succeeded (NO in step SE1107), the process advances to step SE1109. In step SE1109, the panel application 407 determines whether a printed document erase check box 935 shown in FIG. 11 has been checked. If the user instructs deletion after printing (YES in step SE1109), the process advances to step SE1110, and the panel application 407 deletes the print job. An outline of the print job deletion processing has been described in 5-1 to 5-4 of FIG. 4. After the panel application 407 deletes the print job, the process advances to step SE1111. In step SE1111, the panel application 407 ends the processing.

Next, print processing by the job management service 403 will be explained. In step SC1100, the processing by the job management service 403 starts. In step SC1101, the job management service 403 receives the print instruction command transmitted from the panel application 407 in step SE1101. At this time, the job management service 403 also receives the print setting information (FIG. 8) including the identifier of a print job to be printed and the model name of the multifunction peripheral 102. In step SC1102, the job management service 403 creates a print queue for changing execution of printing, details of which will be described later with reference to FIG. 14.

In step SC1103, the job management service 403 searches the job management DB 404 in FIG. 4 for a record which matches the print job identifier obtained in step SC1101. In step SC1104, the job management service 403 acquires an EMFSPOOL file name and DEVMODE structure from the detected record. In step SC1105, the job management service 403 executes print processing for the print queue obtained in step SC1102 by using the EMFSPOOL file name and DEVMODE structure obtained in step SC1104. The job management service 403 controls the printer driver 408, which forms the print queue, to generate PDL jobs, and transmits the PDL jobs and an End job to the panel application 407. At this time, the job management service 403 instructs the printer driver 408 to embed the print job identifier obtained in step SC1101 in the PDL jobs and End job, details of which will be described later with reference to FIG. 16. In step SC1106, the job management service 403 sends back a print execution result (success/failure) to the panel application 407. In step SC1107, the process ends.

Next, job transfer processing by the panel application 407 will be explained. In step SE1150, the processing by the panel application 407 starts. In step SE1151, the panel application 407 receives rendered PDL jobs and an End job from the job management service 403, and transfers the received PDL jobs to the multifunction peripheral 102 (local loopback), details of which will be described later with reference to FIG. 17. After the end of transfer processing, the process ends in step SE1152.

[Print Queue Creation Processing]

Figure 14:
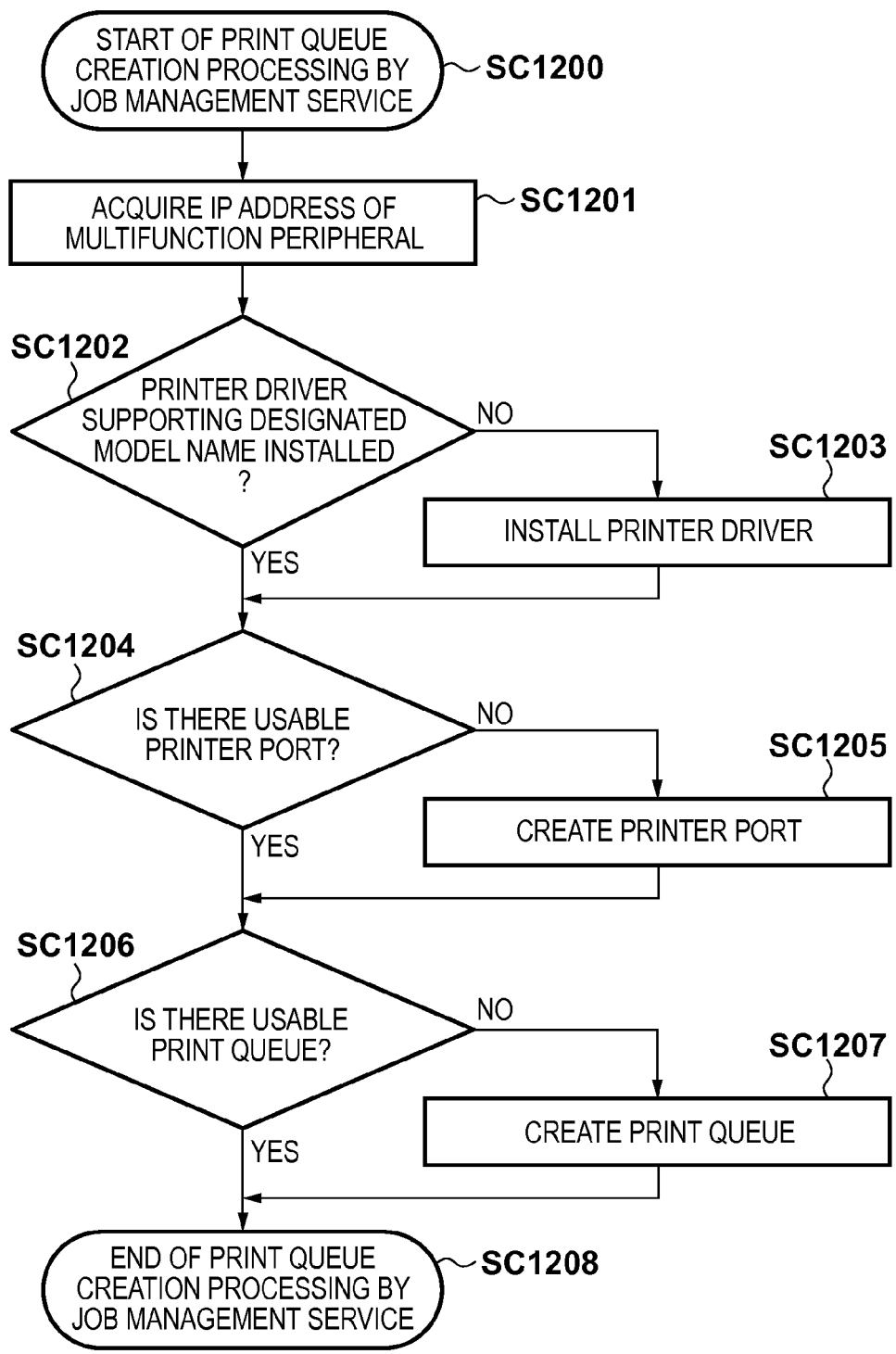
FIG. 14 is a flowchart exemplifying print queue creation processing according to the first embodiment.

FIG. 14 is a flowchart showing print queue creation processing. Steps SC1200 to SC1208 correspond to step SC1102 in FIG. 13A. These flowchart processes are implemented by loading a program stored in the external memory into the RAM and executing it by the CPU of the print server 101 shown in FIG. 1.

In step SC1200, processing by the job management service 403 starts. In step SC1201, the job management service 403 acquires the IP address of the multifunction peripheral 102. The IP address of the multifunction peripheral 102 is obtained when a data transmission/reception connection with the panel application 407 is established. In step SC1202, the job management service 403 determines whether a printer driver which supports the model name of the multifunction peripheral 102 in FIG. 1 has already been installed in the print server 101. If no such printer driver has been installed (NO in step SC1202), the process advances to step SC1203, and the job management service 403 installs, in the print server 101, a printer driver which supports the model name of the multifunction peripheral 102 in FIG. 1. The process then advances to step SC1204.

If the job management service 403 determines that such a printer driver has been installed (YES in step SC1202), the process advances to step SC1204. At this stage, the installed printer driver corresponds to the printer driver 408 in FIGS. 4 and 12. In step SC1204, the job management service 403 determines whether there is a usable printer port. The usable printer port is a printer port which is connectable to the IP address obtained in step SC1201 by the Raw protocol using the network port number "9110". Although the network port number of the Raw protocol is generally 9100, it is important to set a value other than "9100" in order to make a port number at which PDL data is received from the print server 101, different from a port number used when the multifunction peripheral 102 performs local loopback of PDL data within the multifunction peripheral 102. This sequence has been described with reference to FIG. 12.

If the job management service 403 determines that there is no usable printer port (NO in step SC1204), the process advances to step SC1205, and the job management service 403 creates a print queue using a usable printer port. Thereafter, the process advances to step SC1206. If the job management service 403 determines that there is a usable printer port (YES in step SC1204), the process advances to step SC1206. In step SC1206, the job management service 403 determines whether a print queue which is formed from the installed printer driver 408 and the printer port obtained in steps SC1204 and SC1205 exists on the print server 101. If no such print queue exists (NO in step SC1206), the process advances to step SC1207, and the job management service 403 creates, by using the installed printer driver 408, a print queue which uses the printer ports obtained in steps SC1204 and SC1205. The process then advances to step SC1208. If the job management service 403 determines that such a print queue exists (YES in step SC1206), the process advances to step SC1208. In step SC1208, the process ends.

[Print Cancel Processing]

Figure 15:
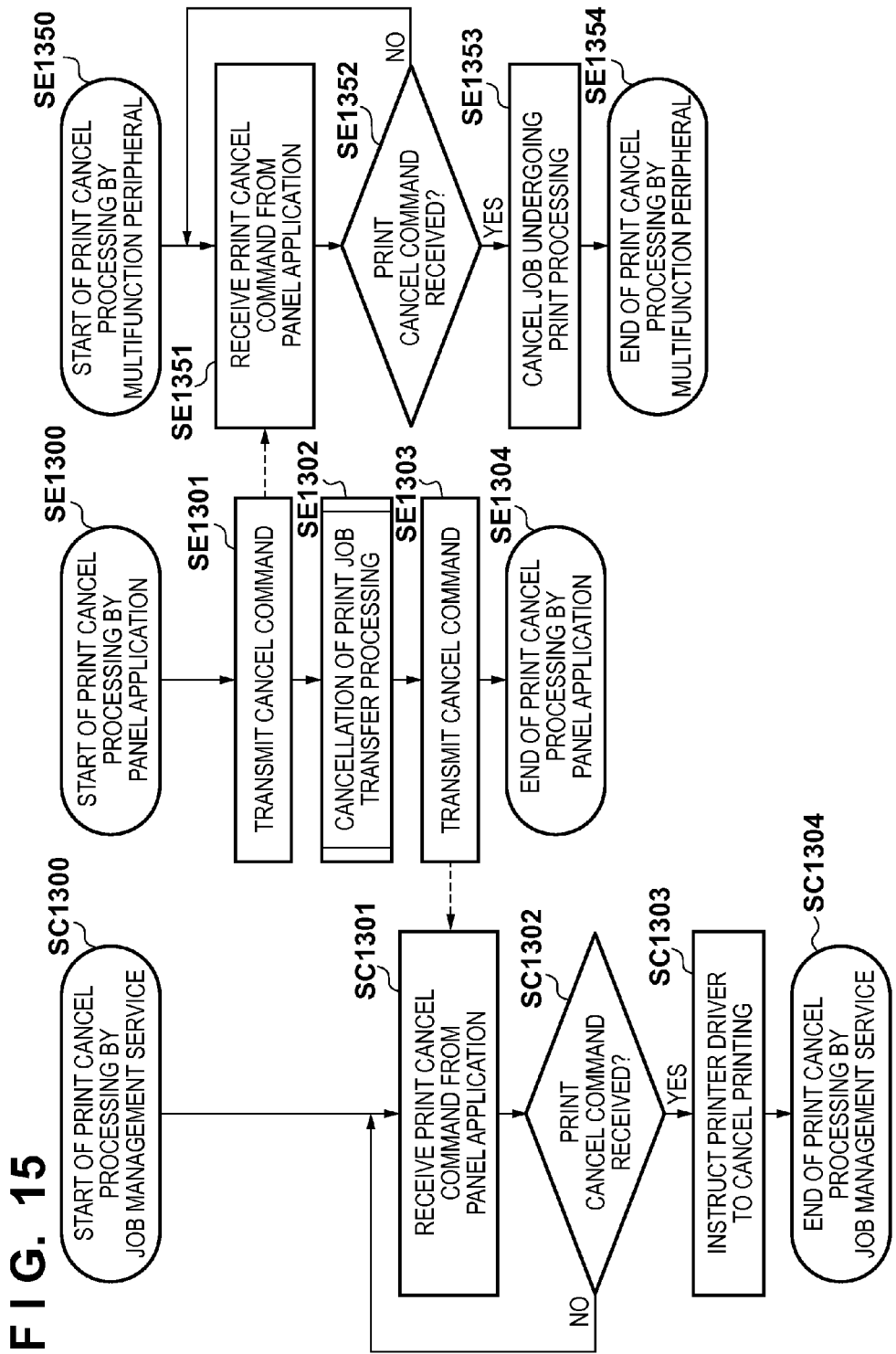
FIG. 15 is a flowchart exemplifying print cancel processing according to the first embodiment.

FIG. 15 is a flowchart showing print cancel processing called in step SE1104 of FIG. 13B. In this processing sequence, broken arrows indicate data flows between the apparatuses.

Steps SE1300 to SE1304 correspond to print cancel processing by the panel application 407 shown in FIG. 12. These flowchart processes are implemented by loading a program stored in the external memory into the RAM and executing it by the CPU of the multifunction peripheral 102 shown in FIG. 1.

Steps SE1350 to SE1354 correspond to print cancel processing by the multifunction peripheral 102 shown in FIG. 4. These flowchart processes are implemented by loading a program stored in the external memory into the RAM and executing it by the CPU of the multifunction peripheral 102 shown in FIG. 1.

Steps SC1300 to SC1304 correspond to print cancel processing by the job management service 403 shown in FIG. 4. These flowchart processes are implemented by loading a program stored in the external memory into the RAM and executing it by the CPU of the print server 101 shown in FIG. 1.

In step SE1300, the print cancel processing by the panel application 407 starts. In step SE1301, the panel application 407 instructs the multifunction peripheral 102 to cancel printing. At this time, the panel application 407 also transmits the identifier of a print job to be canceled to the multifunction peripheral 102. In step SE1302, the panel application 407 cancels processing of transferring, in 3-5 of FIG. 12, a print job received in 3-4. Details of the transfer processing and cancel processing will be described later with reference to FIG. 17. In step SE1303, the panel application 407 instructs the job management service 403 to cancel printing. At this time, the panel application 407 also transmits the model name of the multifunction peripheral 102 to the job management service 403. In step SE1303, the process ends.

In step SE1350, the print cancel processing by the multifunction peripheral 102 starts. In step SE1351, if the panel application 407 transmits a print cancel command, the multifunction peripheral 102 receives the print cancel command and the identifier of a print job to be canceled. In step SE1352, the multifunction peripheral 102 determines whether it has received the print cancel command from the panel application 407. If the multifunction peripheral 102 has received the print cancel command (YES in step SE1352), the process advances to step SE1353. If the multifunction peripheral 102 has not received the print cancel command (NO in step SE1352), the process returns to step SE1351. In step SE1353, the multifunction peripheral 102 cancels all jobs undergoing print processing in which the internally designated print job identifier is embedded. In step SE1354, the process ends.

In step SC1300, the print cancel processing by the job management service 403 starts. In step SC1301, if the panel application 407 transmits a print cancel command, the job management service 403 receives the print cancel command and the model name of the multifunction peripheral 102. In step SC1302, the job management service 403 determines whether it has received the print cancel command from the panel application 407. If the job management service 403 has received the print cancel command (YES in step SC1302), the process advances to step SC1303. If the job management service 403 has not received the print cancel command (NO in step SC1302), the process returns to step SC1301.

In step SC1303, the job management service 403 instructs the printer driver 408, which is formed from a print queue generated from the model name of the multifunction peripheral 102, to cancel all print jobs undergoing print processing. Details of cancel processing by the printer driver 408 during print processing will be described later with reference to FIG. 16. In step SC1304, the process ends.

[Print Processing]

Figure 16:
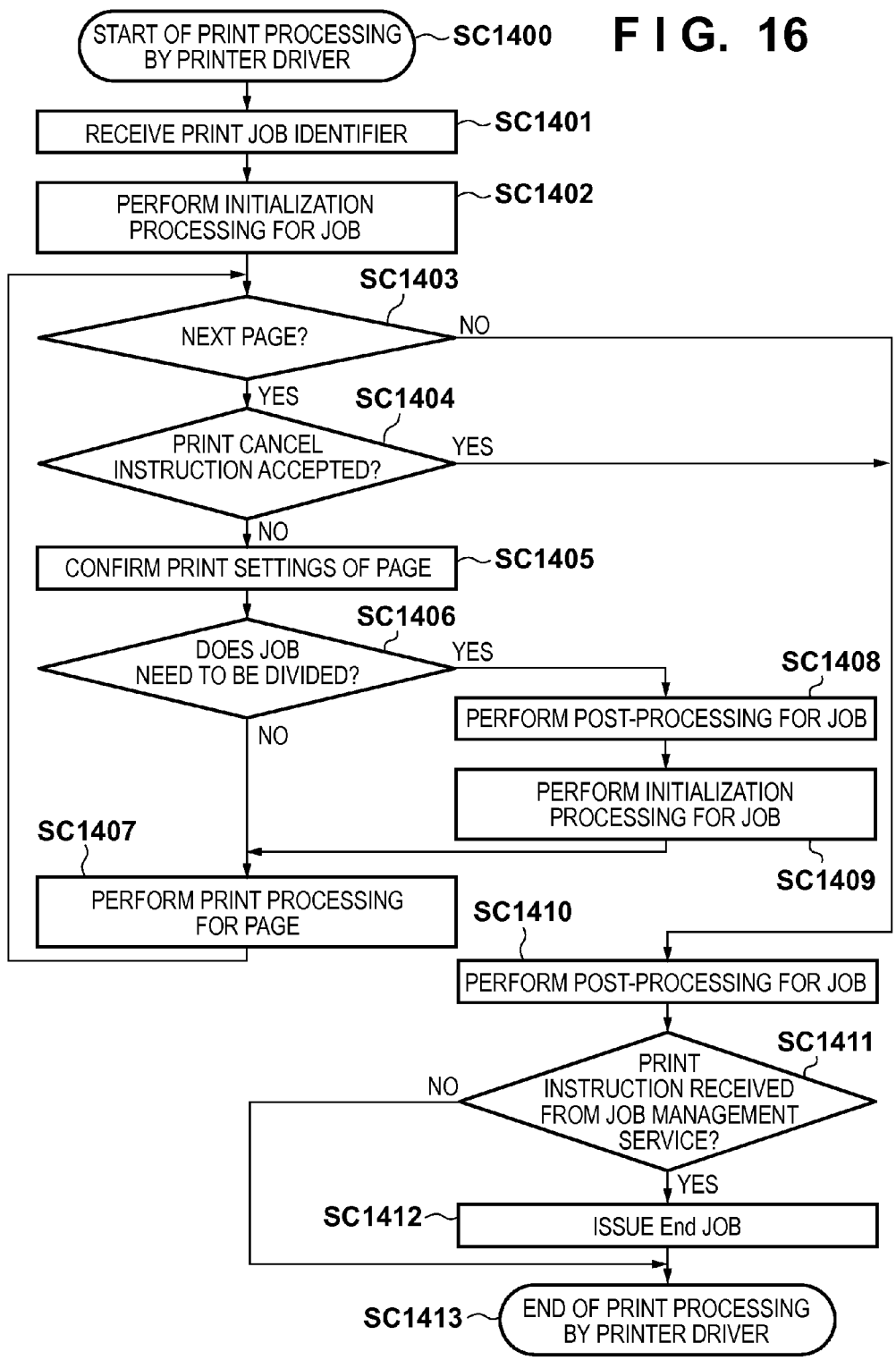
FIG. 16 is a flowchart exemplifying processing by a printer driver according to the first embodiment.

FIG. 16 is a flowchart for explaining processing of generating and outputting a PDL job by the printer driver 408 in 3-4 of FIG. 12, and processing based on the print cancel instruction in step SC1303 of FIG. 15. These flowchart processes are implemented by loading a program stored in the external memory into the RAM and executing it by the CPU of the print server 101 shown in FIG. 1.

In step SC1400, the print processing by the printer driver 408 starts. In step SC1401, the printer driver 408 receives a print job identifier transmitted from the job management service 403. In step SC1402, the printer driver 408 executes initialization processing for a PDL job. At this time, the printer driver 408 embeds, in the PDL job, the print job identifier obtained in step SC1401.

In step SC1403, the printer driver 408 determines whether there is page data to be processed. If there is no page data to be processed (NO in step SC1403), the process advances to step SC1410. If there is a page data to be processed (YES in step SC1403), the process advances to step SC1404. In step SC1404, the printer driver 408 determines whether it has received a print cancel instruction from the job management service 403 in step SC1303 of FIG. 15. If the printer driver 408 has received a print cancel instruction (YES in step SC1404), the process advances to step SC1410. If the printer driver 408 has not received a print cancel instruction (NO in step SC1404), the process advances to step SC1405.

In step SC1405, the printer driver 408 confirms the print settings of the page. What is confirmed is whether a plurality of PDL jobs need to be generated according to the function of the multifunction peripheral 102 and the settings of the print job. For example, when printing a document of 20 pages by a device in which the number of sheets that can be stapled by a finisher (not shown) is 10, the printer driver sometimes generates two PDL jobs for the first to 10th pages and the 11th to 20th pages. Assume that the printer driver 408 confirms information representing that print settings validate stapling, device ability can staple a maximum of 10 sheets, and a page being processed now is the 11th page.

In step SC1406, the printer driver 408 determines, based on the information confirmed in step SC1405, whether to divide the PDL job. In the example of step SC1405 described above, the printer driver 408 determines to divide the job. If the job is to be divided (YES in step SC1406), the process advances to step SC1408, and the printer driver 408 executes post-processing for jobs generated by division. In step SC1409, the printer driver 408 generates a new PDL job. Similar to step SC1402, the printer driver 408 embeds, in the PDL job, the print job identifier obtained in step SC1401. After that, the process advances to step SC1407.

If the printer driver 408 determines that the job need not be divided (NO in step SC1406), the process advances to step SC1407. In step SC1407, the printer driver 408 converts rendering data (EMF) of the page into PDL, and outputs it. The process then returns to step SC1403. As described above, if there is no page data to be processed or if the printer driver 408 has received a print cancel command, the process advances to step SC1410.

In step SC1410, the printer driver 408 executes post-processing for the job. In step SC1411, the printer driver 408 determines whether it has received a print instruction from the job management service 403. In step SC1401, the printer driver 408 receives a print job identifier from the job management service 403. This processing itself is special one which does not exist between a general application and a printer driver. In the embodiment, the printer driver 408 can therefore determine, from execution of step SC1401, that it has received a print instruction from the job management service 403.

If the printer driver 408 determines that it has not received a print instruction from the job management service 403 (YES in step SC1411), the process advances to step SC1413. If the printer driver 408 determines that it has received a print instruction from the job management service 403 (NO in step SC1411), the process advances to step SC1412. In step SC1412, the printer driver 408 issues an End job meaning the termination of the print job. The End job is identical in format to the PDL job generated in steps SC1402 to SC1410. The printer driver 408 also embeds, in the End job, the print job identifier obtained in step SC1401. The process advances to step SC1413 and ends.

[Job Transfer Processing]

Figure 17:
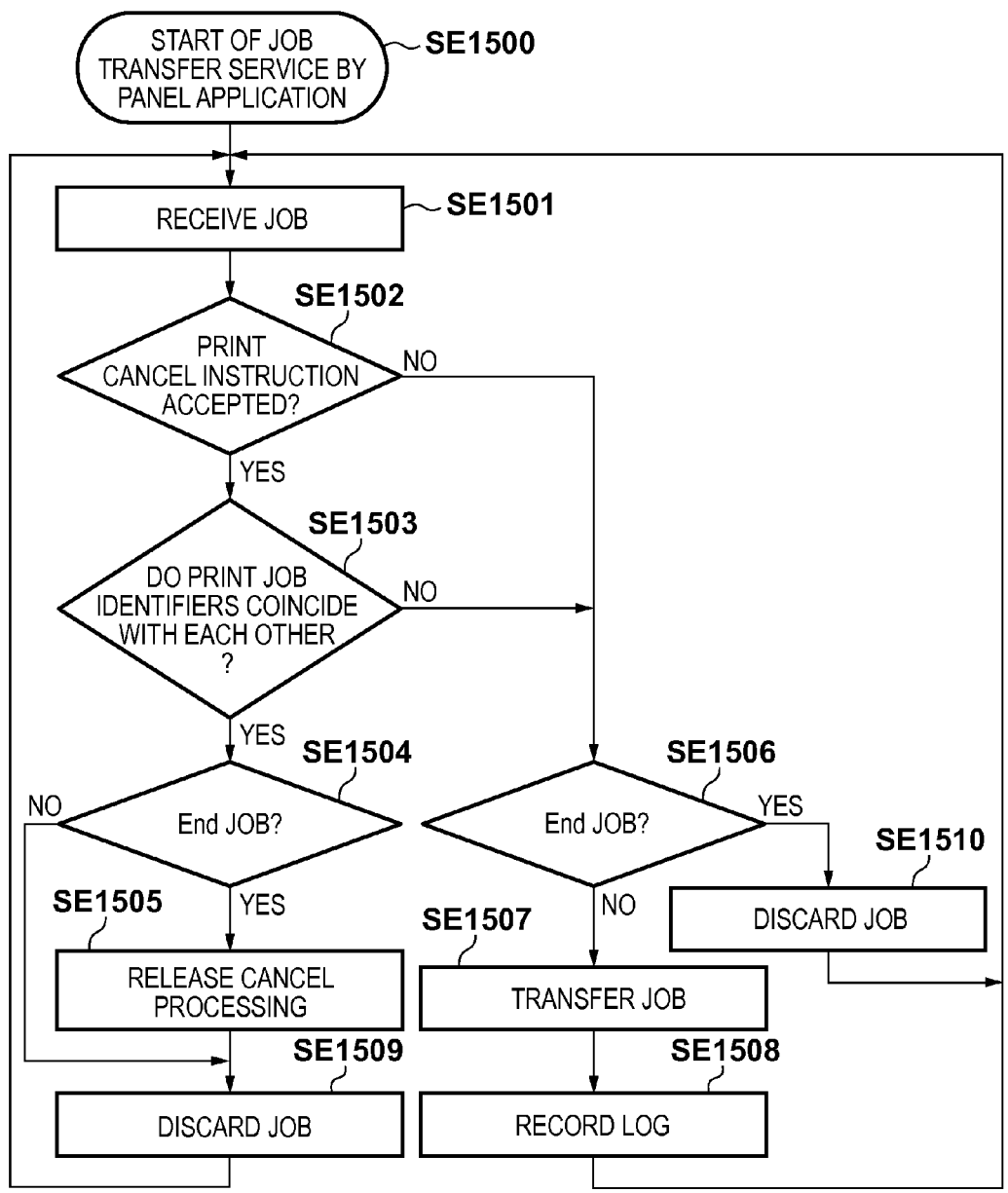
FIG. 17 is a flowchart exemplifying processing by a panel application according to the first embodiment.

FIG. 17 is a flowchart for explaining processing of transferring a PDL job by the panel application 407 in 3-5 of FIG. 12, and the print cancel processing in step SE1302 of FIG. 15. These flowchart processes are implemented by loading a program stored in the external memory into the RAM and executing it by the CPU of the multifunction peripheral 102 shown in FIG. 1.

In step SE1500, the job transfer service by the panel application 407 starts. In step SE1501, the panel application 407 receives job data output from the printer driver 408. In step SE1502, the panel application 407 determines whether it has accepted a print cancel instruction, that is, whether step SE1302 of FIG. 15 has been executed in response to pressing of the cancel button 941 in FIG. 9D. Note that when accepting the print cancel instruction, the identifier of a print job to be canceled is also acquired.

If the application 407 has accepted a print cancel instruction (YES in step SE1502), it compares, in step SE1503, a print job identifier embedded in the job obtained in step SE1501 with the identifier of the print job to be canceled that has been obtained in step SE1502. If these print job identifiers coincide with each other as a result of the comparison (YES in step SE1503), the process advances to step SE1504. In step SE1504, the panel application 407 determines whether the job obtained in step SE1501 is an End job. If the job obtained in step SE1501 is not an End job (NO in step SE1504), the panel application 407 discards in step SE1509 the job obtained in step SE1501, and the process returns to step SE1501.

If the job obtained in step SE1501 is an End job (YES in step SE1504), the process advances to step SE1505. In step SE1505, the panel application 407 releases the cancel instruction of the print job associated with the print job identifier received in step SE1502. Thereafter, the process advances to step SE1509, the panel application 407 discards the job obtained in step SE1501, and the process returns to step SE1501.

If the application 407 has not accepted a print cancel instruction (NO in step SE1502), or if the print job identifiers do not coincide with each other (NO in step SE1503), the process advances to step SE1506. In step SE1506, the panel application 407 determines whether the job obtained in step SE1501 is an End job. If the job obtained in step SE1501 is an End job (YES in step SE1506), the process advances to step SE1510, the panel application 407 discards the job obtained in step SE1501, and the process returns to step SE1501. If the job obtained in step SE1501 is not an End job (NO in step SE1506), the process advances to step SE1507.

In step SE1507, the panel application 407 transfers the job obtained in step SE1501 to the multifunction peripheral 102. Since the panel application 407 runs on the multifunction peripheral 102, the "transfer" indicates local loopback using a special address "127.0.0.1" indicating the panel application 407 itself and using a network port: 9100 (Raw port) when the IP address is IPv4. In step SE1508, the panel application 407 records history information of the print job in the log file. Recoding the history information in the log at this timing obviates the need to record information of the End job in the log file. Then, the process returns to step SE1501.

As for a PDL job which has been transferred to the printing unit of the multifunction peripheral 102, a print cancel instruction is transmitted, as represented by 4-1 of FIG. 12. Thus, processing is canceled even for the transferred PDL job.

As described above, print cancel processing can be properly performed even when a printer driver which may generate a plurality of PDL jobs is applied to a server and print processing is performed in the pull print system in which print data to be temporarily accumulated in a server is converted into a device-independent intermediate format.

Second Embodiment

The second embodiment for practicing the present invention will be described with reference to the accompanying drawings. In the first embodiment, the client PC 100 and print server 101 exist as separate apparatuses. To the contrary, in the second embodiment, a client PC 100 implements the function of a print server 101. Although the overall pull print sequence in the printing system according to the first embodiment is shown in FIGS. 4 and 12, an overall pull print sequence according to the second embodiment is shown in FIGS. 18 and 19.

In FIGS. 18 and 19, the print server 101 does not exist, and the client PC 100 implements a function equivalent to the print server 101. This system does not require the print server 101. However, the arrangement in the second embodiment causes a new problem specific to this arrangement. More specifically, in 3-4 of FIG. 19, a printer driver 408 outputs a plurality of PDL jobs and an End job. As described in the first embodiment, the printer driver 408 needs to issue an End job even if it is instructed to cancel printing. In the second embodiment, however, the client PC 100 issues an End job, so the user of the client PC 100 who has print job management authority can easily stop/delete the End job.

To solve this problem, the print queue creation processing described in the first embodiment with reference to FIG. 14 is changed as shown in FIG. 20. The same processes are executed in steps SC1200 to SC1208 of FIG. 14 and steps SC1800 to SC1808 of FIG. 20, and a description thereof will not be repeated.

The difference between FIGS. 14 and 20 is that processing in step SC1809 is added in FIG. 20. In step SC1809, the job management service 403 changes access authority information of a print queue created in step SC1807. The access authority information is expressed by a list of user objects or group objects. For the access authority information, only a user object to be executed in steps SC1800 to SC1809 is left in the list, and the remaining user objects and all group objects are deleted from the list. That is, access of a program which creates a print queue is permitted, and the remaining user programs act to reject access.

In the arrangement of the second embodiment, an End job may be hidden on the display unit so that the user cannot refer to it. In other words, the above arrangement changes the access authority so that the user cannot delete an End job. However, another arrangement which inhibits the user from deleting an End job can also solve the problem arising from the arrangement of the second embodiment.

In the arrangement of the second embodiment, in addition to the effects of the first embodiment, erroneous stop/deletion of an End job by the user of the client PC 100 who has print job management authority can be prevented by changing access authority information of a print queue.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-251023, filed Nov. 16, 2011, and No.

2012-193572, filed Sep. 3, 2012, which are hereby incorporated by reference herein in their entirety.

What is claimed is:

1. A printing system comprising an image forming apparatus and an information processing apparatus,
    the information processing apparatus including:
        a generation unit configured to generate a series of print jobs of a format corresponding to the image forming apparatus from data corresponding to a single print job in accordance with a request from the image forming apparatus;
        an addition unit configured to add, to the series of print jobs, a termination job indicating a termination of the series of print jobs; and
        an output unit configured to output the series of print jobs including the termination job to the image forming apparatus sequentially, and
    the image forming apparatus including:
        a receiving unit configured to receive the series of print jobs from the information processing apparatus sequentially;
        a printing unit configured to perform print processing of a print job; and
        an accepting unit configured to accept a cancel instruction for the single print job,
    wherein when the accepting unit accepts the cancel instruction for the single print job while receiving the series of print jobs corresponding to the single print job, the receiving unit deletes the whole series of print jobs until the termination job is added to the series of print jobs generated from the data corresponding to the single print job is received and cancels the print processing by the printing unit.

2. The system according to claim 1, wherein the cancel instruction is accepted via an operation unit of one of the information processing apparatus and the image forming apparatus.

3. The system according to claim 1, wherein the addition unit sets, for the termination job, access authority with which a user cannot delete the termination job.

4. The system according to claim 1, wherein the image forming apparatus further includes a display unit configured to display a job corresponding to data of an intermediate format, and
    wherein the display unit controls to hide the termination job from a user to inhibit the user from deleting the termination job.

5. The system according to claim 1, wherein in the image forming apparatus, a port used when the receiving unit receives the series of print jobs and a port used when the series of print jobs is transferred to the printing unit are different.

6. The system according to claim 1, wherein the series of print jobs is transferred to the printing unit by local loopback.

7. The system according to claim 1, wherein the addition unit sets, in the series of print jobs and the termination job, an identifier indicating a job corresponding to data of an intermediate format.

8. The system according to claim 1, wherein the series of print jobs includes information representing an end of a job.

9. A control method comprising:
    generating a series of print jobs of a format corresponding to an image forming apparatus from data corresponding to a single print job in accordance with a request from the image forming apparatus;
    adding, to the series of print jobs, a termination job indicating a termination of the series of print jobs;
    outputting the series of print jobs including the termination job to the image forming apparatus sequentially;
    receiving the series of print jobs from an image forming apparatus sequentially;
    performing print processing of a print job; and
    accepting a cancel instruction for the single print job,
    wherein in the accepting step, when the cancel instruction for the single print job is accepted while the series of print jobs corresponding to the single print job is received, the whole series of print jobs are deleted until the termination job which is added to the series of print jobs generated from the data corresponding to the single print job is received and the print processing is canceled.

10. The method according to claim 9, wherein the cancel instruction is accepted via an operation unit of one of the information processing apparatus and the image forming apparatus.

11. The method according to claim 9, wherein in the adding step, access authority with which a user cannot delete the termination job is set for the termination job.

12. The method according to claim 9, further comprising displaying by the image forming apparatus a job corresponding to the data of an intermediate format; and
    controlling the displaying to hide the termination job from a user to inhibit the user from deleting the termination job.

13. The method according to claim 9, wherein in the image forming apparatus, a port used when receiving the series of print jobs, and a port used when transferring the series of print jobs to a printing unit are different.

14. The method according to claim 9, wherein the series of print jobs is transferred to a printing unit by local loopback.

15. The method according to claim 9, wherein in the adding step, an identifier indicating a job corresponding to data of an intermediate format is set in the series of print jobs and the termination job.

16. The method according to claim 9, wherein the series of print jobs includes information representing an end of a job.

* * * * *